(12) United States Patent
Gorman et al.

(10) Patent No.: US 7,765,319 B1
(45) Date of Patent: Jul. 27, 2010

(54) SYSTEM AND METHOD FOR ANALYZING THE STRUCTURE OF LOGICAL NETWORKS

(76) Inventors: Sean P. Gorman, 1425 N. Nash St., No. 18, Arlington, VA (US) 22209; Rajendra G. I. Kulkarni, 5525 Bounds St., Fredericksburg, VA (US) 22407; Laurie Schintler, 5415 Sideburn Rd., Fairfax, VA (US) 22032; Roger R. Stough, 5239 Belle Plains Dr., Centreville, VA (US) 20129

( * ) Notice: Subject to any disclaimer, the term of this patent is extended or adjusted under 35 U.S.C. 154(b) by 1439 days.

(21) Appl. No.: 10/902,416

(22) Filed: Jul. 30, 2004

Related U.S. Application Data

(60) Provisional application No. 60/490,910, filed on Jul. 30, 2003.

(51) Int. Cl.
*G06F 15/173* (2006.01)
*H04L 12/28* (2006.01)

(52) U.S. Cl. ...................... 709/238; 370/351

(58) Field of Classification Search ................. 709/223, 709/238; 370/351
See application file for complete search history.

(56) References Cited

U.S. PATENT DOCUMENTS

| | | | |
|---|---|---|---|
| 5,355,442 A | 10/1994 | Paglieroni et al. | |
| 5,781,704 A | 7/1998 | Rossmo | |
| 6,421,668 B1 | 7/2002 | Yakhini et al. | |
| 6,907,392 B2 | 6/2005 | Bennis et al. | |
| 6,915,211 B2 | 7/2005 | Kram et al. | |
| 7,062,084 B2 | 6/2006 | Messing et al. | |
| 7,120,620 B2 | 10/2006 | Dumas et al. | |
| 7,152,105 B2 | 12/2006 | McClure et al. | |
| 7,177,882 B2 | 2/2007 | Xie et al. | |
| 7,180,516 B2 | 2/2007 | Kapler et al. | |
| 7,181,406 B1 | 2/2007 | Modest | |
| 2001/0048435 A1 | 12/2001 | Deering et al. | |
| 2002/0072993 A1 | 6/2002 | Sandus et al. | |
| 2002/0112232 A1 | 8/2002 | Reams et al. | |
| 2002/0112237 A1 | 8/2002 | Kelts | |
| 2003/0231174 A1 | 12/2003 | Matusik et al. | |
| 2005/0193430 A1 | 9/2005 | Cohen et al. | |
| 2005/0283525 A1 * | 12/2005 | O'Neal et al. | ............... 709/223 |
| 2006/0026170 A1 | 2/2006 | Kreitler et al. | |

(Continued)

FOREIGN PATENT DOCUMENTS

WO    WO 00/70463    11/2000

(Continued)

OTHER PUBLICATIONS

Notice of. Allowance issued in U.S. Appl. No. 10/902,283 mailed Jul. 18, 2008.

(Continued)

*Primary Examiner*—Yves Dalencourt
*Assistant Examiner*—Hee Soo Kim
(74) *Attorney, Agent, or Firm*—DLA Piper LLP US

(57) ABSTRACT

Systems and methods for analyzing the structure of logical networks. Embodiments of the invention include ranking critical nodes according to regional hierarchies, distance hierarchies, global hierarchies, and relay hierarchies. Embodiments of the present invention are capable of testing the effectiveness of such hierarchies. In addition, critical nodes may be used to define critical regions.

18 Claims, 15 Drawing Sheets

U.S. PATENT DOCUMENTS

| | | | |
|---|---|---|---|
| 2006/0078205 A1 | 4/2006 | Porikli et al. | |
| 2006/0085419 A1 | 4/2006 | Rosen | |
| 2006/0136127 A1 | 6/2006 | Coch et al. | |
| 2006/0229058 A1 | 10/2006 | Rosenberg | |

FOREIGN PATENT DOCUMENTS

| | | |
|---|---|---|
| WO | WO 01/59989 | 8/2001 |

OTHER PUBLICATIONS

M.J. Egenhofer, T. Bruns, "Visual Map Algebra: A Direct-Manipulation User Interface for GIS", *Proc. 3th IFIP 2.6 workingconference on visual database systems* (IFIP'95), Lausanne, Switzerland, Mar. 27-29, 1995, S. Spaccapietra, R. Jain (eds.), *Visual Database Systems 3, Visual Information Management*, IFIP Conference Proceedings 34 Chapman & Hall, pp. 235-253, 1995.

Bruns, T.H. and Egenhofer, M.J. *User Interfaces for Map Algebra*, Journal of the Urban and Regional Information Systems Association, vol. 9, No. 1, pp. 44-54, 1997.

D. Pullar, "MapScript: A Map Algebra Programming Language Incorporating Neighborhood Analysis," *Geonformatica*, vol. 5, pp. 145-163, 2001.

International Search Report issued in Application No. PCT/US07/077985 mailed Mar. 12, 2008.

International Search Report issued in Application No. PCT/US08/053727 mailed Jul. 25, 2008.

Written Opinion issued in Application No. PCT/US07/077985 mailed Mar. 12, 2008.

Written Opinion issued in Application No. PCT/US08/053727 mailed Jul. 25, 2008.

S.H. Yook, H. Jeong, A.L. Barabási, "Modeling the Internet's Large-Scale Topology", Dept. of Physics, University of Notre Dame, Notre Dame, IN 46556, USA, 2001.

D.J. Watts, S.H. Strogatz, "Collective dynamics of small-world networks" Nature 393:440-442, 1998.

V. Latora, M. Marchiori, "Is the Boston subway a small-world network?" Physica A 314:109-111, 2002.

A. Lakhina, J.W. Byers, M. Crovella, I. Matta, "On the Geographic Locations of Internet Resources", 2002.

R. Cohen, K. Erez, D. ben-Avraham, and S. Havlin, "Breakdown of the Internet under intentional attack", Physical Review Letters 86:16, 2001.

R. Albert, H. Jeong, and A.L. Barabási, "Error and Attack tolerance in complex networks", Nature 406: 378, 2000.

Tarboton, et al., "Advances in the mapping of flow networks from digital elevation data", Utal Water Research Laboratory, (May 20, 2001).

Pu, et al., "Routing Reliability Analysis of Partially Disjoint Paths", University of Victoria, Victoria, Canada.

Gomes, et al., "An Algorithm for Calculating the K Most Reliable Disjoint Paths with a Maximum Number of Arcs", University of Columbia, Portugal, (1998).

Cohen, et al., "Breakdown of the Internet under intentional attack", Phys. Rev. Lett 86, 3682 (2001).

Albert, et al., "Error and attack tolerance of complex networks", Nature 406, 378-382 (2000).

Yook, et al., "Modeling the Internet's Large Scale Topology", (2001).

Watts, et al., "Collective dynamics of small-world networks", Nature 363:202-204 (1998).

Latora, et al., "Is the Boston sybway a small-world network?", Physica A 313:109-111, (2002).

Lakhina, et al., "On the geographic locations of Internet resources", (2002).

Adamic, L, 2000, "Zipf, Power- laws, and Pareto - a ranking tutorial" *Internet Ecologies Area—Parc Xerox* http://ginger.hpl.hp.com/shl/papers/ranking/ranking.html.

Albert R, Jeong H, Barabasi A, 1999, "The diameter of the World Wide Web" *Nature* 401: 130-131.

Albert R, Barabasi A, 2000, "Topology of evolving networks: Local Events and Universality" *Physical Review Letters* 85: (24) 5234-5237.

Albert R, Barabasi, A, 2002, "Statistical mechanics of complex networks" *Reviews of Modern Physics* 74: 47-97.

Amaral L, Scala A, Barthelemy M, Stanley H, 2000, "Classes of small-world networks" *Proceedings of the National Academy of Sciences* 97 (21): 11149-11152.

Arthur WB, 1999, "Complexity and the economy" *Science* 284: 107-109.

Barabasi A, 2002, *Linked: The New Science of Network*. (Perseus Publishing, New York, NY).

Barabasi A, 2001, "The physics of the Web" *Physics World* Jul. 2001 http://www.physicsweb.org/article/world/14/7/09.

Barabasi A, Albert A, 1999, "Emergence of scaling in random networks" *Science*, Oct. 21, 1999.

Batty M, 2001, "Editorial: Cities as small worlds" *Environment and Planning B: Planning and Design* 28: 637-638.

Beaverstock JV, Smith RG, Taylor PJ, 2000, "World-city network: a new metageography?" *Annals of the Association of American Geographer* 90: 123-134 http://www.jstor.org/pss/1515383.

Bollobás B, 1985, *Random Graphs*. (Academic Press, New York).

Borgatti SP, Everett MG, Freeman LC, 2002, Ucinet for Windows: Software for Social Network Analysis. Harvard: Analytic Technologies http://www.analytictech.com/ucinet/ucinet_5_description.htm.

Cahn RS, 1999, *Wide Area Networks: Concepts and Tools for Optimization*. (San Francisco, CA: Morgan Kaufmann Publishers Inc.).

Caida (1998) "Mapnet: Macroscopic Internet Visualization and Measurement" *Caida* http://www.caida.org/tools/visualization/mapnet/.

Chen Q, Hyunseok C, Govindan R, Sugih J, Schenker S, Willinger W, "The origin of power laws in Internet topologies revisited," *Proceedings of IEEE Infocom* 2002.

Junho H. Choi et al., "Comparing World City Networks: A Network Analysis of Internet Backbone and Air Transport Intercity Linkages", Global Networks, vol. 6, No. 1, pp. 81-99 (2006).

Economist, 2001, "Drowning in glass" *The Economist* Mar. 22—http://www.economist.com/business/displayStory.cfm?Story_ID=540709.

Erdos P, Renyi A, 1960, On the evolution of random graphs, *Publication of the Mathematical Institute of the Hungarian Academy of Science* vol. 5 pp. 17-67.

Faloutsos C, Faloutsos P, Faloutsos M, 1999, "On Power-Law Relationships of the Internet Topology", *Computer Communication Review*.

Garrison W, 1968, "Connectivity of the interstate highway system" in Berry B, Marble D, 1968, *Spatial Analysis*. (Englewood Cliffs, NJ: Prentice Hall) pp. 239-249.

Gilder G, 2000, *Telecosm*. (New York: Free Press, 2000).

Gorman SP, Malecki EJ, 2000, "The networks of the Internet: an analysis of provider networks in the USA" *Telecommunications Policy* 24: 113-134 (2000).

Gorman, SP, Malecki EJ, "Fixed and Fluid: Stability and Change in the Geography of the Internet" *Telecommunications Policy* 26, 389-413 (2002).

Gorman, SP and Mcintee A, "Tethered connectivity? The spatial distribution of wireless infrastructure"*Environment and Planning A* 2003, vol. 35, pp. 1157-1171.

Haggett P, Chorley R, 1969, *Network Analysis in Geography*. (New York: St, Martins Press).

Hayes B, 2000a, "Graph theory in practice: Part I" *American Scientist* 88 (01): 9-13 http://www.americanscientist.org/issues/num2/graph-theory-in-practice-part-i/1.

Hayes B, 2000b, "Graph theory in practice: Part II" *American Scientist* 88 (02): 104-109 http://www.americanscientist.org/issues/pub/graph-theory-in-practice-part-ii/1.

Huberman B, Adamic L, 1999, "Growth Dynamics of the World Wide Web" *Nature* 401:131-134.

Kansky K, 1963, *Structure of Transportation Networks: Relationships Between Network Geometry and Regional Characteristics*. (University of Chicago, Department of Geography, Research Papers).

Lakhina, A, Byers, JW, Crovella, M, Matta, I, 2002, "On the Geographic Locations of Internet Resources"http://www.cs.bu.edu/techreports/pdf/2002-015-internetgeography.pdf.

Latora V, Marchiori M, 2002, "Is the Boston subway a small-world network?" *Physica A* 314:109-111.

Malecki EJ, 2002, "The Economic Geography of the Internet's infrastructure," *Economic Geography*, vol. 78, No. 4, pp. 399-424.

Malecki EJ, Gorman SP, "Maybe the death of distance, but not the end of geography: the Internet as a network", in SD Brunn, TR Leinbach, (eds.) *The Worlds of Electronic Commerce*. (New York: John Wiley) pp. 87-105 (2001).

Milgram S, 1977, The small world problem. in *The Individual in a Social World: Essays and Experiments*. Milgrim, S, Sabini, J, (Eds) pp. 281-295. Reading, MA: Addison-Wesley.

Moss ML and Townsend A, 2000, "The Internet backbone and the American metropolis" *The Information Society* 16: 35-47.

Paltridge S, 2002, "Internet traffic exchange and the development of end-to-end international telecommunications competition" (OECD: Working Paper).

Radoslavov P, Tangmunarunkit H, Yu H, Govindan R, Schenker S, Estrin D, 2000, "On characterizing network topologies and analyzing their impact on protocol design" *Tech Report* 00-731, University of Southern California, Dept. of CS.

Seidman, S, 1983, "Internal cohesion of LS sets in graphs." *Social Networks* 5:97-107.

Simon HA, Bonini CP, 1958; "The size distribution of business firms" *The American Economic Review* 48: 607-617.

Stoneham, AKM, 1977, "The small- world problem in a spatial context" *Environment and Planning A* 9: 185-195.

Tangmunarunkit H, Govindan R, Jamin S, Schenker S, and Willinger W, 2001, "Network topologies, power laws, and hierarchy" *Tech Report* USC-CS-01-746—http://isi.edu/~hongsuda/pu... USCTech01_746.ps.

Telegeography, 2002, *Packet Geography 2002: Global Internet Statistics and Comments*. Telegeography Inc: 1909 K St., NW Suite 380 Washington, DC 20006 USA http://www.telegeography.com/products/books/pg/index.html.

Townsend A, 2001, "Network cities and the global structure of the Internet" *American Behavioral Scientist* 44 (10): 1697-1716.

Wasserman, S. and Faust, K., 1994, *Social Network Analysis: Methods and Applications* (Cambridge Univ. Press, Cambridge).

Watts DJ, Strogatz SH, 1998, "Collective dynamics of small-world networks" *Nature* 393: 440-442.

Watts DJ, *Small Worlds: The Dynamics of Networks between Order and Randomness* (Princeton University Press, Princeton, NJ) (1999).

Watts, DJ, 2003, *Six Degrees: The Science of a Connected Age* (W.W. Norton, New York, NY).

Yook SH, Jeong H, Barabasi AL, 2001, "Modeling the Internet's Large-Scale Topology" http://xxx.lanl.gov/abs/cond-mat/0107417.

Zipf PK, *Human Behavior and the Principle of Least Effort*; Addison-Wesley, Cambridge, MA; pp. 445-516 (1949).

Gao, L., 2001, On inferring autonomous system relationships in the Internet. *IEEE/ACM Transactions on networking* 9(6). 733.

The White House: *The National Strategy to Secure Cyberspace*.

NRC, 2002, *Cybersecurity Today and Tomorrow: Pay Now or Pay Later Washington*, DC: National Academy Press.

NSTAC, 2002, *Network Security/Vulnerability Assessments Task Force Report Washington, DC*: The President's National Security Telecommunications Advisory Committee—http://www.ncs.gov/nstac/NSVATF-Report-(FINAL).htm.

Moore, D., Paxson, V., Savage, S., Colleen, S., Staniford, S., and Weaver, N. 2003, *The spread of the Sapphire/Slammer worm*. CAIDA—http://www.caida.org/outreach/papers/2003/sapphire/sapphire.html.

Magoni, D. and Pansiot, J.J., 2001, Analysis of the Autonomous system network topology. *Proceedings of ACM SIGCOMM'*01.

Callaway, D.S., Newman, M.E.J., Strogatz, S.H., and Watts, D.J., 2000, "Network robustness and fragility: percolation on random graphs." *Physical Review Letters* 85 (25): 5468-5471.

Cohen, R., Erez, K., ben-Avraham, D., and Havlin, S., 2001 Breakdown of the Internet under intentional attack. *Physical Review Letters* 86:16.

Gorman, S.P. and Kulkarni, R., Spatial small worlds: New geographic patterns for an information economy. *Environment and Planning B: Planning and Design* 2004, vol. 31, pp. 273-296.

Gorman, S.P , Schintler, L.A., Kulkarni, R.G., and Stough, R.R., *The revenge of distance: Vulnerability analysis of critical information infrastructure*. in submission (2002).

Grubesic, T.H., O'Kelly, M.E., and Murray, A.T., (2003) A geographic perspective on telecommunication network survivability. *Telematics and Informatics* 20(1): 51-69.

Cliff A., Haggett P., and Ord K. Graph theory and geography. *In*: Wilson R. and Beineke L. (Eds) *Applications of graph theory*. London: Academic Press, pp. 293-326 (1979).

Lawyer, G., 2003, The battle of the bug: Government, industry move to protect Internet from cyber attacks, viruses. http://www.xchangemag.com/articles/1B1front4.html.

Pastor-Satorras, R., Vespignani, A., 2001, Epidemic dynamics and endemic states in complex networks. *Physical Review/* E 63: 066117.

Moreno, Y., Vazquez, A., 2003, *Disease spreading in structured scale free networks*. The European Physical Journal B 31:265-271.

Dezsos, A., Barabasi, A.L., 2002, *Halting viruses in scale-free networks*. Physical Review E 65:055103 (R).

Newman, M.E.J., Forest, S., and Balthrop, J., 2002, Email networks and the spread of computer viruses. *Physical Review* E 66:035101(R).

Hunker, J., 2002, Policy challenges in building dependability in global infrastructures. *Computers & Security* 21 (8): 705-711.

Dinc M., Haynes K.E., Stough R.R., and Yilmaz S., 1998, Regional universal telecommunication service provisions in the US—Efficiency versus penetration. *Telecommunications Policy* 22 (6): 541-553.

Tarjanne, P., 1999, Preparing for the next revolution in telecommunications: implementing the WTO agreements Policy 22(6): 541-553.

Pastor-Satorras, R., and Vespignani, A., 2002, Immunization of complex networks. *Physical Review* E 65:036104-1.

Moore, D., Shannon, C., Voelker, G.M., and Savage, S., 2003, *Internet quarantine: Requirements for containing self-propagating code*. INFOCOM 2003 http://www.caida.org/outreach/papers/2003/quarantine/.

Atkinson, R. (1998) "Technological Change and Cities.," *Cityscape: A Journal of Policy Development and Research* 3 (3): 129-170.

Bhandari, R. (1999) *Survivable Networks: Algorithms for Diverse Routing*. Boston: Kluwer Academic Press.

Brunn, S D. and Leinbach, T R. (1991) *Collapsing Space & Time: Geographic Aspects of Communication & Information*. New York: Harper Collins Academic.

Cairncross, F. (1997) *The Death of Distance*. Boston: Harvard Business School Press.

Castells, M. (1989) *The informational City*. Oxford, UK: Blackwell.

Falk, T., Abler, R. (1980) Intercommunications, Distance, and Geographical Theory. *Geografiska Annaler*, Series B, 62: 35-56.

Gillespie, A. and Robins, K. (1989) Geographical Inequalities: The Spatial Bias of the New Communications Technologies. *Journal of Communications* 39 (3): 7-18.

Kunreuther, H., Heal, G. and Orszag, P. (2002), "Interdependent Security: Implications for Homeland Security Policy and Other Areas," *The Brookings institute*, Policy Brief #108.

Lowe, J. and Moryadas, S. (1975) *The Geography of Movement*. Prospect Heights, IL: Waveland Press.

Malecki, E.J.; The Internet Age: Not the End of Geography, in D. Felsenstein and M.J. Taylor, eds. *Promoting Local Growth: Process, Practice and Policy*. Aldershot: Ashgate, 2001, pp. 227-253.

Malecki, E.J. (2002) The Internet: A preliminary analysis of its evolving economic geography, *Economic Geograraphy*, vol, 78, No. 4, pp. 399-424.

Medina, A., Matta, I., and Byers, J. (2000) On the origin of power-laws in Internet topologies. *ACM Computer Communications Review* 30(2).

Moss, M.L. and Townsend, A. (1997) Tracking the net using domain names to measure the growth of the Internet in US cities. *Journal of Urban Technology* 4(3): 47-60.

Negroponte, N. (1995) *Being Digital*. New York: Alfred A. Knopf.

Pansiot, J. and Grad, D. (1998) On routes and multicast trees in the Internet. *ACM SIGCOMM Computer Communications Review* 28(1): 41-50.

Paxson, V. (1996) End-to-end routing behavior in the Internet. *Proceedings of the ACM SIGCOMM 96'* Sep.: 25-38.

Redner, S. (1998) How popular is your paper? An empirical study of the citation distribution. *European Physical Journal B* 4: 131-134.

Yasin, R.; Gov't to map infrastructure. Internetweek.com http://www.internetweek.com/story/INW20011206S0001 (2001).

Schintler, L., Kulkarni, R., Gorman, S.P., and Stough, R.; Power and Packets: A Spatial network Comparison of the US Electric Power Grid and Internet Network, pp. pp 35-60 (2004).

Amin, M, 2001, "Toward self-healing energy infrastructure systems," *IEEE Computer Applications in Power* 14(1): 20-28.

Berry B, Marble D, 1968, *Spatial Analysis*. Englewood Cliffs, NJ: Prentice Hall, 1966.

Christaller, W. (1933) *Central Places in Southern Germany*. Jena, Germany: Fischer (English Translation by C.W. Baskin, London: Prentice Hall, 1966).

Collins J, 2002, "Dominant Cisco grows router market share" *Personal Computer World* http://www.pcw.co.uk/News/1131853.

Elmes G, "The changing geography of electric energy in the United States—Retrospect and prospect" *Geography* 81 (4): 347-360 (1996).

FCC Network Outage Reporting System: User Manual, Nov. 30, 2004.

GAO Jan. 2003, "Critical infrastructure protection: Efforts of the financial services sector to address cyber threats", *Report to the Subcommittee on Domestic Monetary Policy, Technology, and Economic Growth, Committee on Financial Services, House of Representatives*.

Halsne C, 2003, "North Sound 911 Service Repeatedly Targeted" *KIRO TV* http://www.kirotv.com/news/2601577/detail.html.

Huitema C, 1995, *Routing in the Internet* Englewood, CA: Prentice Hall.

Knox PL, Taylor PJ, 1995, *World Cities in a World-System* New York: Cambridge University Press.

Langdale JV, 1989, "The geography of international business telecommunications: The role of leased networks" *Annals of the Association of American Geographers* 79(4): 501-522.

Lerten B, 2003, "Tower saboteur: I was only pointing out flaws" *The Bend Bugle* Nov. 23 http://bend.com/news/ar_viewΛ3Far_idΛ3D12260.htm.

Leyshon A, 1996, "Financial exclusion and the shifting boundaries of the financial system" *Environment and Planning A* 28(7): 1150-1156.

Lindstron A, "Tunnel Vision?" Broadbandweek.com http://www.broadbandweek.com/news/010806/010806_news_fiber.htm (2001).

Longcore T, Rees P, 1996, "Information technology and downtown restructuring: The case of New York City's financial district" *Urban Geography* 17: 354-372 Maine PUC, 2003, http://www.state.me.us/mpuc/misctranscripts/2002-43%20080503.htm.

Moss, M. (1998) Technologies and Cities. *Cityscape: A Journal of Policy Development and Research* 3: 107-127.

Neuman P, 1991, "NY area fiber-optic telephone cable severed; extensive effects" *The Risk Digest* 10:75 http://catless.ncl.ac.uk/Risks/10.75html#subj1.

Neuman P, 2000, "Week-long outage after cable cut downs 11,000 phone lines" *The Risk Digest* 20:84 http://catless.ncl.ac.uk/Risks/20.84html#subj6.1.

Neuman R, 2002, "Wall street worries" *U.S. News & World Reports* September, 23.

NIST, 1995, *The Impact of the FCC's Open Network Architecture on NS/NP Telecommunications Security* Washington DC: National Institute of Standards and Technology http://csrc.nist.gov/publicationsinistpubs/800-11/titleona.html.

Nyusten JD, Dacey MF, 1968, A graph theory interpretation of nodal regions. In Berry B, Marble, D, 1968, *Spatial Analysis* Englewood Cliffs, NJ: Prentice Hall 407-418.

O'Kelly ME, Grubesic TH, (2002) Backbone topology, access, and the commercial Internet, 1997-2000. *Environment and Planning B* 29(4): 533-552.

'PSERC, 2003, "Public Utilities Commission of Ohio, sequence of events on Aug. 14, 2003" http://www.pserc.wisc.edu/Ohio_Only_Sequence_of_Events.pdf.

Cowie, et al., Impact of the 2003 Blackouts on Internet Communication: Preliminary Report, Nov. 21, 2003 (21 pages).

Taaffe, E.J. and Gauthier. H.L. (1973) *Geography of Transportation* Englewood Cliffs, NJ: Prentice Hall.

Warf B, 1995, "Telecommunications and the changing geographies of knowledge transmission in the late 20th century" *Urban Studies* 32(2): 361-378.

Wheeler DC, O'Kelly ME, 1999, "Network topology and city accessibility of the commercial Internet" *Professional Geographer* 51:327-339.

Malecki, EJ, "Fibre tracks: explaining investment in fibre optic backbones" *Entrepreneurship & Regional Development*, (Jan. 16, 2004), 21-39.

Evans-Cowley, J, Malecki, EJ, and McIntee, A 2002, "Planning Responses to Telecom Hotels: What Accounts for Increased Regulation of Co-location Facilities?", *Journal of Urban Technology*, vol, 9, No. 3, pp. 1-18.

International Search Report issued in Application No. PCT/US2005/026752 mailed Dec. 22, 2006.

Written Opinion issued in Application no. PCT/US2005/026752 mailed Dec. 22, 2006.

International Preliminary Report on Patentability issued in Application No. PCT/US2005/026752 mailed Dec. 22, 2006.

Odlyzko, A.M., "Comments on the Larry Roberts and Caspian Networks Study of Internet Traffic Growth", The Cook Report on the Internet, (2001) pp. 12-15.

Notice of Allowance issued in U.S. Appl. No. 10/902,283 mailed Dec. 30, 2008.

Pallas R. et al.: "A pragmatic approach to debris flow hazard mapping in areas affected by Hurricane Mitch: example from NW Nicaragua", Engineering Geology, Elsevier Science Publishers, Amsterdam, NL, vol. 72, No. 1-2, Mar. 1, 2004, pp. 57-72.

European Search Report issued in Application No. 05777205.5 mailed Dec. 23, 2008.

international Preliminary Report on Patentability issued in Application No. PCT/US07/077985 mailed Mar. 19, 2009.

International Preliminary Report on Patentability issued in Application No. PCT/US08/053727 mailed Aug. 27, 2009.

Supplemental Notice of Allowance issued in U.S. Appl. No. 10/902,283, mailed Feb. 25, 2009.

* cited by examiner

FIGURE 2

205 NETWORK DATA LOADED INTO SYSTEM AS ONE OR MORE NODES

210 EACH NODE ASSIGNED TO A REGION.

215 LINKS BETWEEN NODES DESIGNATED AS GLOBAL OR LOCAL.

220 TAKE RATIO OF GLOBAL/LOCAL LINKS AND WEIGHT.

225 RANK NODES BASED ON WEIGHED RATIO FOR EACH NODE.

LOAD NETWORK DATA INTO SYSTEM AS ONE OR MORE NODES.

910

DEFINE AND CALCULATE DISTANCE BETWEEN NODES.

915

RANKS LINKS BETWEEN NODES.

920

RANK NODES BASED ON LINK RANKING.

SYSTEM AND METHOD FOR ANALYZING THE STRUCTURE OF LOGICAL NETWORKS

This application claims priority from U.S. Provisional Application Ser. No. 60/490,910 filed Jul. 30, 2003. The entirety of that provisional application is incorporated herein by reference.

FEDERALLY SPONSORED DEVELOPMENT

This invention was made with U.S. Government support under grant number 60NANB2D0108, awarded by the National Institute of Standards and Technology (NIST). The U.S. Government may have certain rights in this invention.

FIELD OF THE INVENTION

The invention relates to systems and methods for analyzing the structure of logical networks.

BRIEF DESCRIPTION OF THE FIGURES

FIG. 2 illustrates the method of a regional hierarchy, according to one embodiment of the invention.

FIGS. 3-5 illustrate an example of the method of a regional hierarchy, according to one embodiment of the invention.

FIG. 9 illustrates the method of the global hierarchy, according to one embodiment of the invention.

DESCRIPTION OF SEVERAL EMBODIMENTS OF THE INVENTION

Embodiments of the present invention relate to systems and methods for analyzing the structure of logical networks. The embodiments outlined can be used in spatial and non-spatial contexts for a variety of logical network structures.

System

Figure 1:
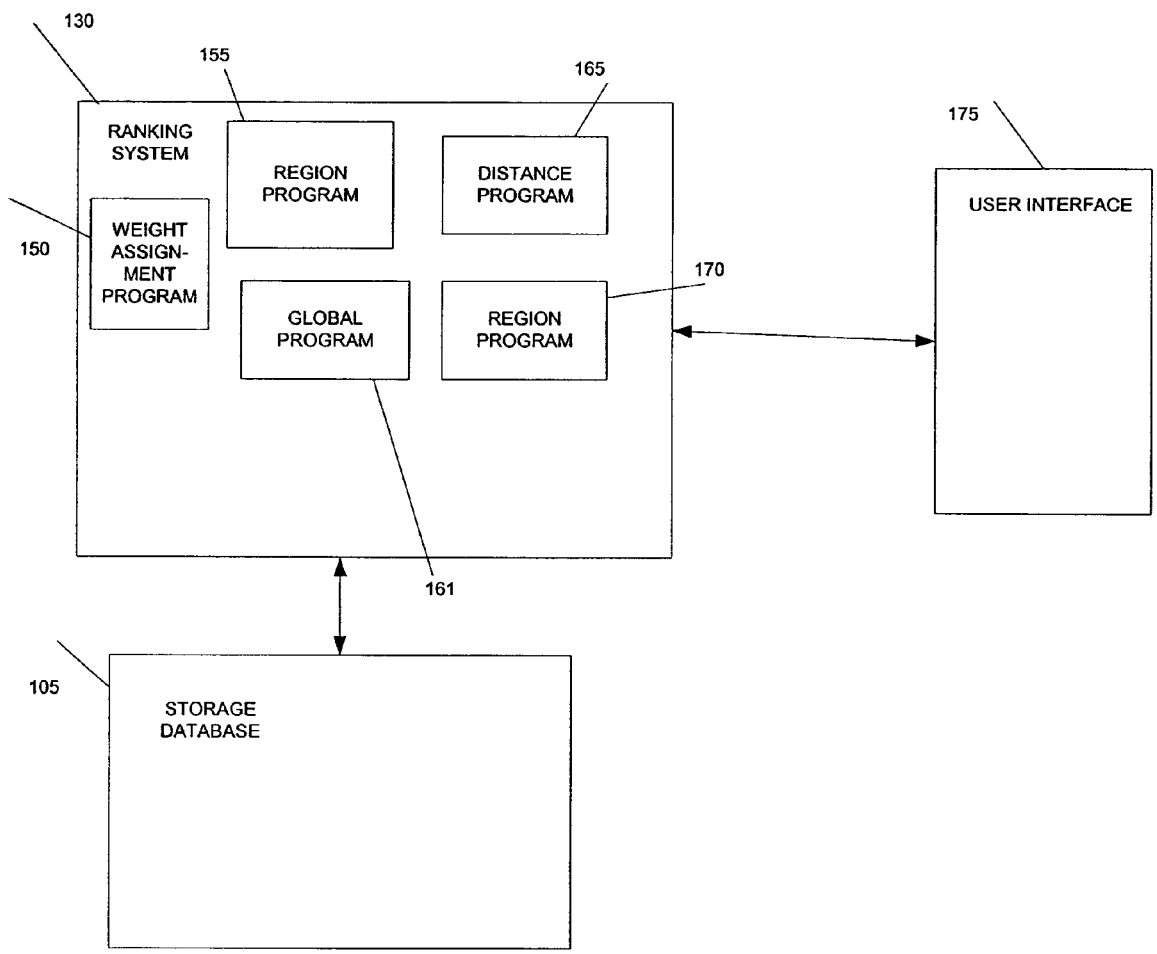
FIG. 1 illustrates a system, according to one embodiment of the present invention.

FIG. 1 illustrates a system, according to one embodiment of the present invention. The system includes a storage database 105, which stores the data utilized in the present invention (e.g., network data) and a user interface 175. The network data comprises, for example, but not limited to: satellite imagery data; digitized map data; topological map data; photo data; satellite geo-spatial data; telecommunication data; marketing data; demographic data; business data; North American Industrial Classification (NAIC) code location data; right-of-way routing layers data; metropolitan area fiber geo-spatial data; long haul fiber geo-spatial data; co-location facilities geo-spatial data; internet exchanges geo-spatial data; wireless towers geo-spatial data; wire centers geo-spatial data; undersea cables geo-spatial data; undersea cable landings geo-spatial data; data centers geo-spatial data; static network data; or dynamic network data; or any combination of the above. The right-of-way routing layers data comprises, for example, but not limited to: gas pipeline data; oil pipeline data; highway data; rail data; or electric power transmission lines data; or any combination of the above. The logical network data comprises, for example, but not limited to: static network data; or dynamic network data; or any combination of the above. The static network data comprises, for example, but not limited to: ip network data; or network topology data; or any combination of the above. The dynamic network data comprises, for example, but not limited to, network traffic data. The regional analysis comprises, for example, but not limited to: continent information; nation information; state information; county information; zip code information; census block information; census track information; time information; metropolitan information; or functional information; or any combination of the above. The function information comprises, for example, but not limited to: a formula; a federal reserve bank region; a trade zone; a census region; or a monetary region; or any combination of the above.

Data can be obtained by performing, for example, but not limited to: purchasing data; manually constructing data; mining data from external sources; probing networks; tracing networks; accessing proprietary data; or digitizing hard copy data; or any combination of the above.

The system also includes a ranking system 130, which can include: a region program 155, a distance program 165, a global program 161, or a relay program 170, or any combination thereof. The region program 155 is a node criticality ranking approach which defines global connections as links that connect two different regions and local connections as links within a region. The definition of region is fluid including geographic regions, topological regions, industrial sectors, markets, etc. The distance program 165 is a node criticality ranking approach which defines global connections as links over a certain distance threshold and local connections as links under a certain distance threshold. The definition of distance is fluid including Euclidean distance, Manhattan distance, latency, bandwidth, flow measurements etc. The global program 161 is a node criticality ranking approach which looks only at the number of global connections utilizing either the region program 155 or the distance program 165. The relay program 170 is a node criticality ranking approach which takes the ratio of the total capacity connected to a node (i.e., supply) and the demand for that capacity to identify nodes that are acting as relays between large demand areas.

Regional Hierarchy

In many networks one or more nodes can be identified in a specific region that are most critical to the operation of that region. The region could be geographic, non-geographic, or both. For example, in a geographic region, the most critical nodes for Internet connectivity or airline traffic in a specified geographic area could be identified. As another example, the network (an autonomous system) that is the most critical to the connectivity of financial institutions connected to the Internet could be determined. In addition, the region could be a fusion of both geographic and non-geographic areas where the region is an individual network (autonomous systems) and the interconnection of different networks happens in specific geographic locations. In this case, the most critical interconnection points (i.e., nodes) of several networks could be determined. Embodiments of the invention could be used in a variety of network scenarios, including supply chains, social networks, or any other logical network structure.

FIG. 2 illustrates the method of a regional hierarchy, according to one embodiment of the invention.

Figure 3:
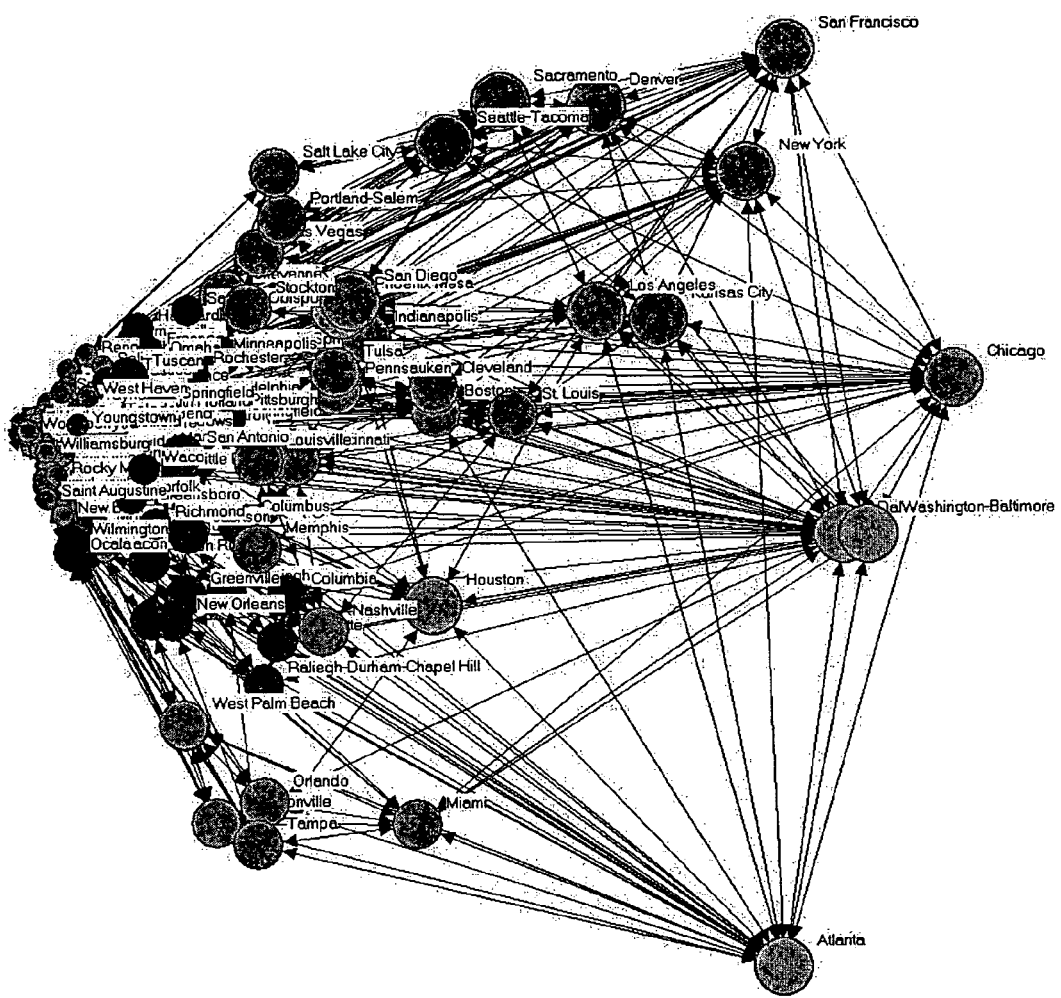

In step 205, the network data is loaded into the system as one or more nodes. For example, the sample city-to-city long haul data network illustrated in FIG. 3 could be loaded into the system. Each of the nodes in a network has a location indicated by an identifier. For example, in a geographic region, the location could be tied to a city name. In a non-geographic networks, locations can be indicated by other identifiers.

Figure 4:
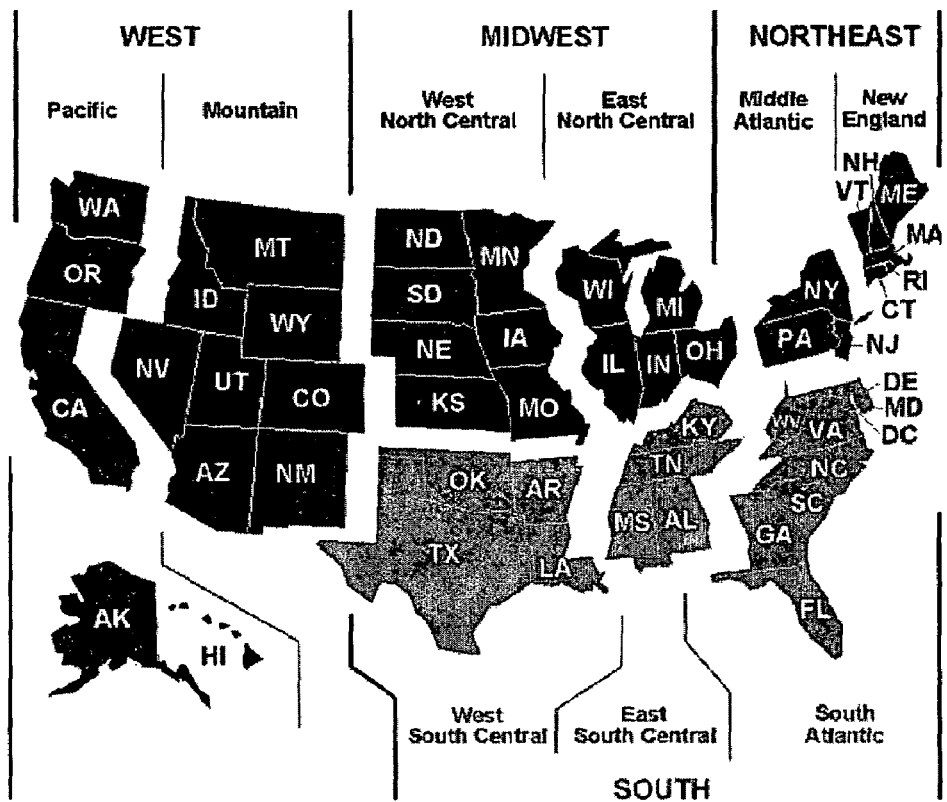

In step 210, each node in the network is assigned to a region based on the node's location. The regions can be defined in a fluid manner, depending on the desires of the user. In the city-to-city long haul data network example, the nodes could be allocated to census regions illustrated in FIG. 4.

In step 215, once each node in the network has been assigned to a region, links (i.e., connections) between nodes are designated as global or local. Links that occur within a region are designated as local links, and links that connect nodes located in different regions are designated as global links. In the city-to-city long haul data network example, a connection between Atlanta, Ga. and Jacksonville, Fla. would be designated as a local link because both nodes are located in the South Atlantic Region.

In step 220, once all links have been designated as global or local links, a ratio of global links to local links is taken for each node in the network, and then weighted by the total number of links to the node. Thus, in the city-to-city long haul data network example, a ratio of one city's (i.e., node's) global links to local links is computed, and then the ratio is weighted by the total connectivity of the network (i.e., the total number of nodes in the network). This would provide an indicator of how well the city acts as a regional connector in the network.

Figure 5:
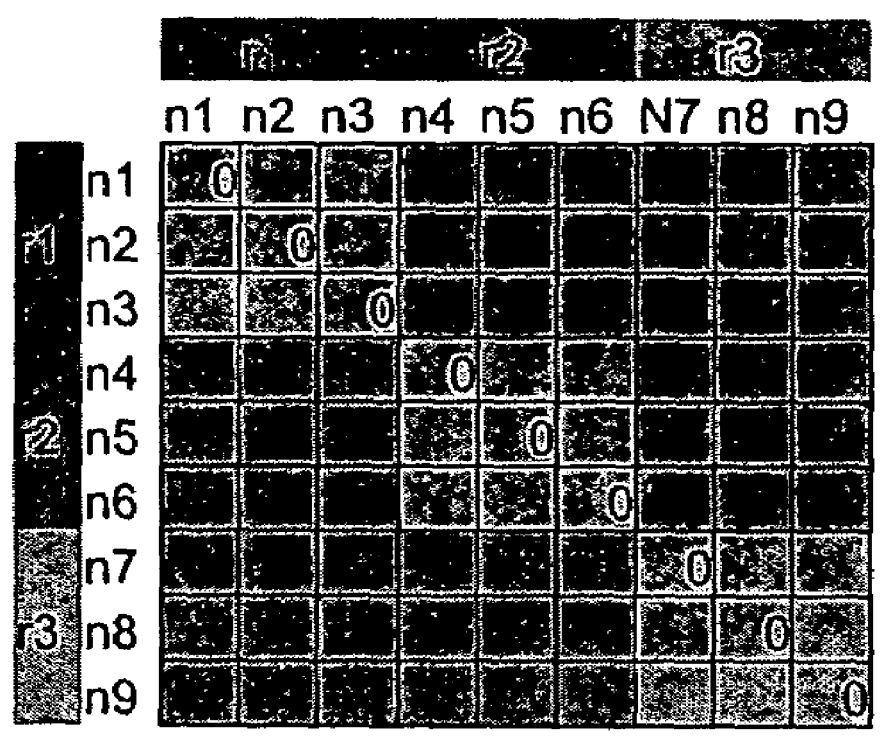

In one embodiment, this process is expressed mathematically as follows: Consider a large network of nodes n, spanning an area A consisting of regions r, with a variable number of nodes inside each region that have a variable number of connections from each region to other regions. For a region r with p number of nodes n, a p×p contiguity matrix represents connections between these nodes. As illustrated in FIG. 5, a contiguity or adjacency matrix M for the entire network of m number of regions r can be constructed as a block diagonal matrix, where matrices along the main diagonal (indicated in the boxes where there is no grid pattern) refer to the contiguity matrices for each of the regions. Interregional connections are represented as the off-block-diagonal elements (indicated in the boxes with a grid pattern).

If a node i in region r is connected to another node j in the same region, then that connection is considered as a local link and is denoted by $q_{i(r)j(r)}$. If node in region r is connected to node k in region s then that connection is considered as a global connection and is denoted by $g_{i(r)k(s)}$. Thus, one may associate each node i(r) with a global connectivity index as a ratio between its global and local connections, weighted by the total number of global and local connections for the entire network.

The total number of global connections G is computed from the elements of the upper triangular block of matrix M, of m regions, each with a variable number of nodes:

$$G = \sum_{i(1)} \sum_{s>1}^{m} \sum_{k(s)} g_{i(1)k(s)} + \qquad (1)$$

$$\sum_{i(2)} \sum_{s>2}^{m} \sum_{k(s)} g_{i(2)k(s)} + \dots + \sum_{i(m-1)} \sum_{s>m-1}^{m} \sum_{k(s)} g_{i(m-1)k(s)}$$

Note that, because m is the last region in the block diagonal matrix, its global connections have already been computed in the previous m−1 blocks.

The total number of local connections L is a sum over all the local connections over m regions and is given by:

$$L = \sum_{i(1)} \sum_{j(1)>i(1)} q_{i(1),j(1)} + \sum_{i(2)} \sum_{j(2)>i(2)} q_{i(2),j(2)} + \dots + \sum_{i(m)} \sum_{j(m)>i(m)} q_{i(m),j(m)} \qquad (2)$$

Thus, for example, if Jacksonville, Fla. was located in the Southeast region and had local connections to other region in the Southeast, including Orlando, Fla., Atlanta, Ga., Tallahassee, Fla., and Charlotte, N.C., but also a connection outside of the Southeast to Washington, D.C. in the Mid-Atlantic region it would have one local connections (G) and four local connections (L). In a non-spatial context an example would be identifying a critical autonomous system in the financial sector. The Bank of New York could have local connections to other autonomous systems in the financial region such as Morgan Stanley and Goldman Sachs, and also have connections to autonomous systems outside of the financial region such as the Federal Reserve (Govt.), MCI (Telecom) Sprint (Telecom), and General Electric (Tech/Manufacturing). In this case the Bank of New York would have two local connections and four global connections.

The global connectivity index for a node i in region r is then given by:

$$C_{i(r)} = \left( \frac{\sum_{s \ne r}^{m} \sum_{k(s)} g_{i(r)k(s)}}{1 + \sum_{j(r), j \ne i} q_{i(r)j(r)}} \right) \times (G + L) \qquad (3)$$

Note that the numeral of 1 in the denominator indicates a self-loop of a node.

Using the example of Jacksonville above the equation would then be plugged with G=1 and L=4 resulting in $C_{i(r)}$= [(1/(1+4))×(1+4)]=1 indicating a relatively low level of criticality in the network. Using the Bank of New York examples the equation would then be plugged with G=4 and L=2 resulting in $C_{i(r)}$=[(4/(1+2))×(4+2)]=8 indicating a relatively high level of criticality in the network.

When the hierarchies above are set for the city-to-city long haul data network example, the following node criticality ranking is produced:

| Top Sixteen Nodes | |
|---|---|
| CMSA | Region Score |
| New York | 135.7567108 |
| Chicago | 120.3182127 |

-continued

Top Sixteen Nodes

| CMSA | Region Score |
|---|---|
| San Francisco | 111.5303899 |
| Washington | 98.90846075 |
| Boston | 93.70275229 |
| Dallas | 92.40582839 |
| Denver | 81.42618849 |
| St. Louis | 56.1399932 |
| Cleveland | 43.84487073 |
| Louisville | 41.33944954 |
| Kansas City | 39.37090433 |
| Seattle | 34.70472307 |
| Phoenix | 34.70472307 |
| Los Angeles | 33.95740498 |
| Atlanta | 33.68399592 |

Thus, the most critical nodes in the network, ranked beginning with the most critical node, are: New York, Chicago, San Francisco, Washington, etc.

Distance Hierarchy

Figure 6:
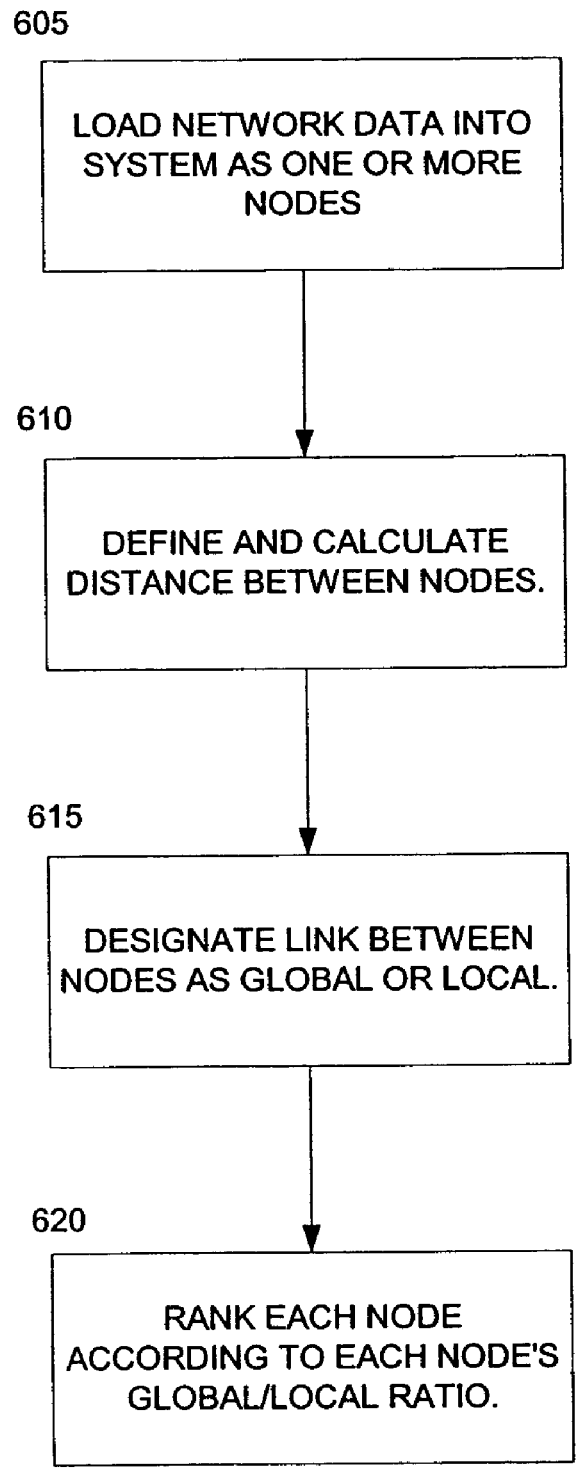
FIG. 6 illustrates the method of a distance hierarchy, according to one embodiment of the invention.

FIG. 6 illustrates the method of the distance hierarchy, according to one embodiment of the invention. In step 605, the network data is loaded into the system as one or more nodes.

In step 610, the distances between the nodes are defined and calculated. Distance is defined according to the desire of the user (e.g., Euclidean distance, latency, capacity, flow data). In this example, distance is defined as Euclidean distance.

In step 615, the link between nodes is designated as global or local. The designation can be determined by automating the node criticality-ranking equation with an incremental set of test distances. The test distances are used to calculate the ratio of global to local links, weighted by the total number of links connected for each individual node in the network. In one embodiment, this process is expressed mathematically as follows:

$$R = \left( \frac{\sum_j g_{ij} > D}{1 + \sum_j l_{ij} \leq D} \right) \left( \sum_j g_{ij} + \sum_j l_{ij} \right) \quad (4)$$

where $\Sigma g_{ij}$ represents the numbered links between node i and nodes having a distance greater than a threshold value D; and $\Sigma l_{ij}$ represents the number of links between node i and nodes having a distance less than or equal to the threshold D. Using the Jacksonville example again, the distance between Jacksonville and its five connecting cities would be calculated as follows: Jacksonville-Atlanta=287 miles, Jacksonville-Orlando=127 miles, Jacksonville-Tallahassee=157 miles, Jacksonville-Charlotte=339 miles, and Jacksonville-DC=647 miles. Using a threshold of 300 miles, there would be three local connections (Jacksonville-Atlanta, Jacksonville-Orlando, and Jacksonville-Tallahassee) and two global connections (Jacksonville-Charlotte and Jacksonville-DC). When these numbers are plugged into the equation, the result is R=[(2/(1+3))×(2+3)]=2.5, raising the relative criticality ranking of the city from the regional hierarchy. Distance could also be calculated by other functions such as the flow between two nodes. If the same example looked at the tonnage of goods shipped between Jacksonville and its connections, the calculation would be: Jacksonville-Atlanta=6000 tons, Jacksonville-Orlando=8000 tons, Jacksonville-Tallahassee=500 tons, Jacksonville-Charlotte=1500 tons, and Jacksonville-DC=250 tons. Using a threshold of 1000 tons as the break between global and local, there would be two local connections (Jacksonville-Tallahassee and Jacksonville-DC) and three global connections (Jacksonville-Atlanta, Jacksonville-Orlando, and Jacksonville-Charlotte). When these numbers are in turn plugged into the equation, the result is R=[(3/(1+2))×(3+2)]=5, raising the relative criticality ranking of the city from the previous definition of distance. The same calculation could be done using many other definitions of local and global to determine other relationships, such as bandwidth capacity between nodes or the number of passengers using an airline route.

The test distances are then loaded in the equation and the output is graphed for the various test distances. The inflection point of the graphed curved is used as the distance threshold to run the hierarchy. An example of this is illustrated below using the city-to-city data network utilized previously. A series of alternative distances for distance D (e.g., 100 miles, 200 miles) are selected and used to simulate global/local ratios utilizing the city-to-city data network:

where D∈[100, 200, 300 . . . 2700]

Figure 7:
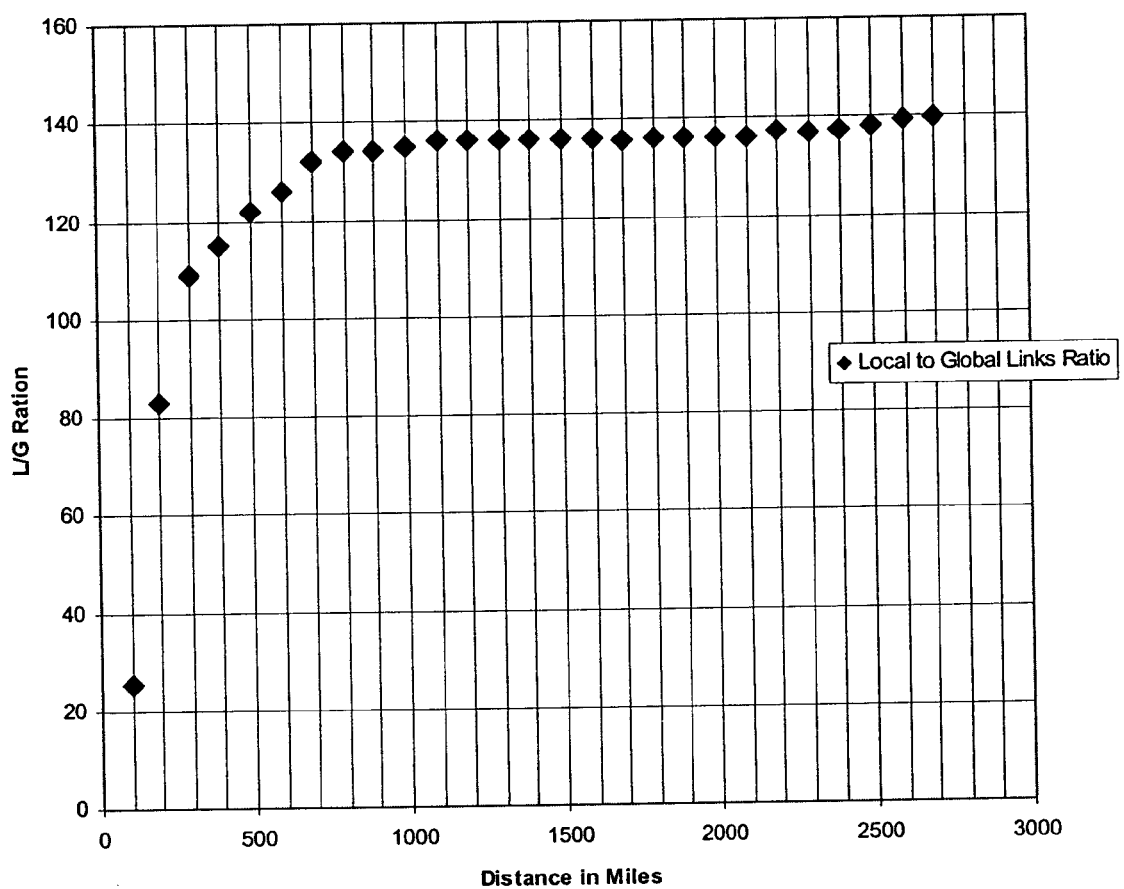
FIGS. 7-8 illustrate the method of a distance hierarchy, according to one embodiment of the invention.

The simulations produce the graph presented in the FIG. 7, where the x-axis are the increments of the global/local ratio produced by different values of D, and the y-axis are the percentage of nodes with a global to local ratio greater than one. FIG. 7 shows a sharp shift at about 300 miles and a second shift at about 700 miles.

Figure 8:
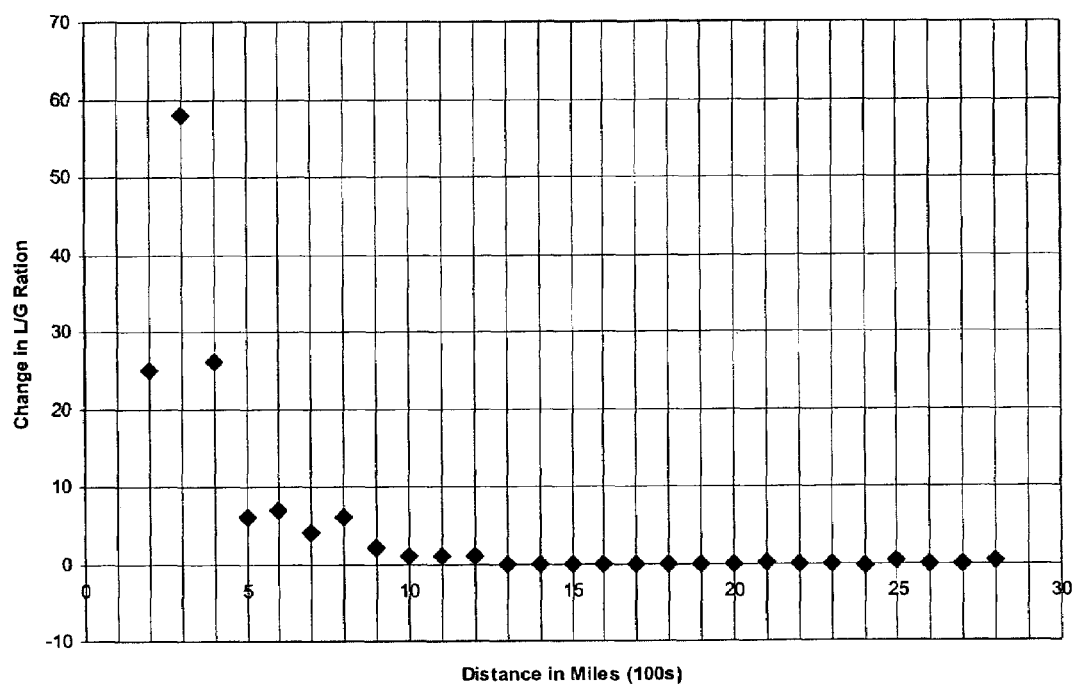

To find the exact point of inflection, the rate of change (i.e., derivative) in the global to local ratio is calculated, as illustrated in FIG. 8.

The rate of change illustrated in FIG. 8 clearly points to 300 miles being the primary point of inflection. Under such an assumptions, all links shorter than 300 miles are considered local and all links over 300 miles are considered global.

In step 620, the hierarchy of step 615 is utilized for each node in the network to produce a criticality ranking, which ranks each node according to its global/local ratio. A sample of the out put for the hierarchy is displayed below.

Top Sixteen Nodes

| CMSA | Global/Local Ratio |
|---|---|
| Salt Lake City | 342 |
| Denver | 312 |
| San Francisco | 159 |
| Dallas | 94 |
| Seattle | 79 |
| Chicago | 71 |
| Los Angeles | 65 |
| Atlanta | 64 |
| Washington | 62 |
| New York | 59 |
| Phoenix | 55 |
| Houston | 48 |
| Miami | 41 |
| Boston | 41 |
| Kansas City | 34 |

Global Hierarchy

FIG. 9 illustrates the method of the global hierarchy, according to one embodiment of the invention. This hierarchy is based on the number of global connections per node. The nodes are ranked based only on this count. In step 905, the network data is loaded into the system as one or more nodes.

In step 910, the distances between each node are defined and calculated. Distance is defined according to the desire of the user (e.g., Euclidean distance, latency, capacity, flow data). In this example, distance is defined as Euclidean distance.

In step 915, the links are ranked according to the following equation $$R_L = \Sigma_j g_{ij} > D \tag{5}$$

where $R_L$=the ranking of the link, and $g_{ij}$ is the distance between nodes i and j and D is a threshold distance.

This ranking provides an indicator of how many long haul global connections a node has, dictated by connections longer than D. (E.g., D was 300 miles in the sample case presented in step 215). In the Jacksonville example, there were two global links in the distance hierarchy example thus $R_L=2$, or using the regional hierarchy's definition of global $R_L=1$. In the financial example $R_L=4$, or in the distance tonnage example $R_L=3$.

In step 920, the nodes are ranked based on the ranking of the links connected to each node.

Relay Hierarchy

Figure 10:
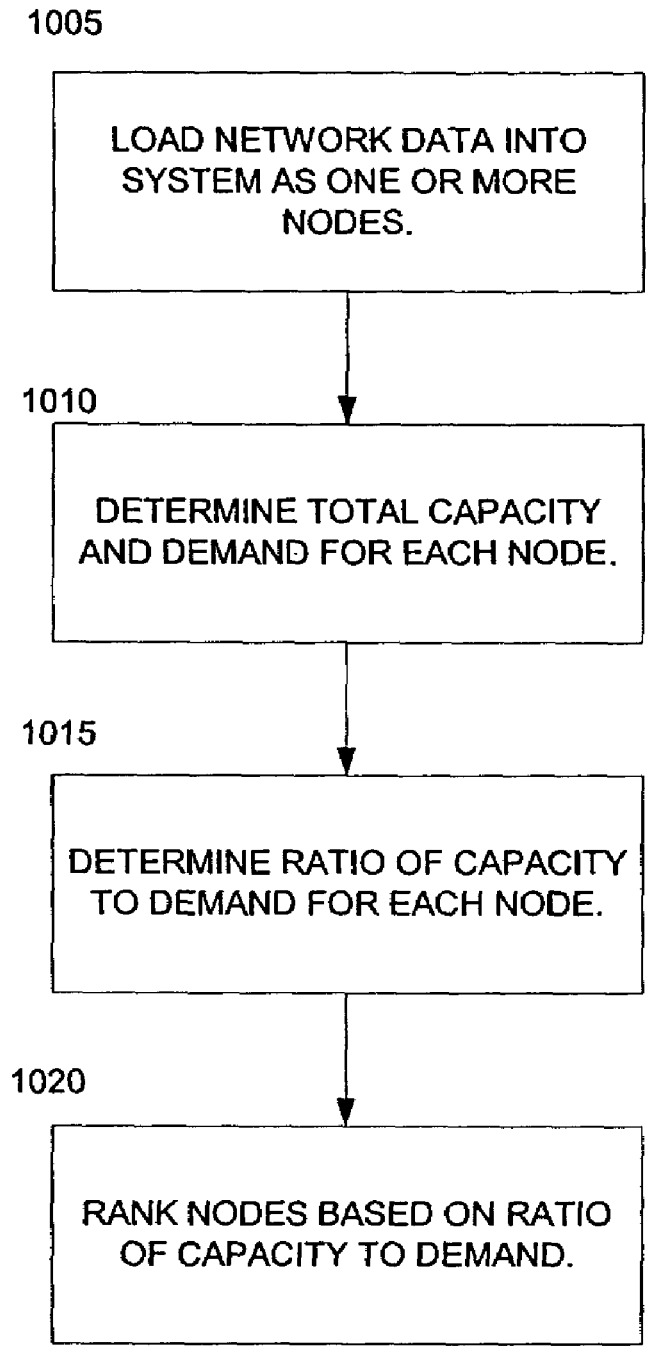
FIG. 10 illustrates the method of the relay hierarchy, according to one embodiment of the invention.

FIG. 10 illustrates the method of the relay hierarchy, according to one embodiment of the invention. This hierarchy identifies relay nodes and their effect on the survivability of the network. Relay nodes are locations that are neither the ultimate origin nor destination of an interaction across a network. The primary purpose of a relay node is to receive flows in order to transmit them to another node with minimum delay and cost. Nodes that act as structural links to relay information to large markets could serve as critical junctures. The following method determines which nodes are disproportionately acting as relay nodes.

In step 1005, the network data is loaded into the system as one or more nodes. In step 1010, the total capacity and demand for each node in the network is determined. For the city-to-city long haul data network example, the total capacity and demand is the total amount of bandwidth connected to the node (i.e., city) and the total bandwidth demand for the node (i.e., city).

In step 1015, the ratio of capacity to demand is determined for each node in the network. Mathematically, this can be expressed as follows:

$$R = \frac{\sum_{i=1}^{n} c_{ij}}{\sum_{i=1}^{n} b_{ij}} \tag{6}$$

where R=ratio of capacity to demand, $c_{ij}$=capacity, and $b_{ij}$=business demand.

The relay hierarchy could be another means used to assess Jacksonville's criticality. Jacksonville's total connected capacity equals 15000 megabytes, but its demand for capacity is only 5000 megabytes, thus its relay ratio would R=(15,000/5000)=3. The same could be done with an airline network, where capacity is the total number of passengers landing at the airport and demand are the number of passengers for which Jacksonville is their destination.

In step 1020, the nodes in the network are ranked based on their ratio R of capacity to demand. The greater the ratio, the higher the rank. This approach provides a rough indicator of how much built capacity exceeds the consumption of capacity dictated by demand. A sample of the out put for the hierarchy of step 1015 is displayed below.

| Top Sixteen Nodes | |
|---|---|
| MSA | Relay Ratio |
| Kansas City | 7.511627907 |
| Salt Lake City | 3.395759717 |
| Indianapolis | 3.208191126 |
| Seattle | 2.962616822 |
| Portland | 2.753665689 |
| Sacramento | 2.679577465 |
| St. Louis | 2.2382134 |
| Denver | 1.951584507 |
| Atlanta | 1.882087099 |
| Washington-Baltimore | 1.795747423 |
| Chicago | 1.712831503 |
| Philadelphia | 1.695364238 |
| Orlando | 1.485314685 |
| Jacksonville | 1.45785877 |
| Phoenix | 1.201257862 |

Testing Node Criticality Ranking Hierarchies

The above hierarchies may be compared to determine which hierarchies are most correct. In order to test the effect of the above hierarchies on a network, each hierarchy is subjected to simulations.

Accessibility Index. The most commonly used indicator of node criticality is the number of connections a node has, often called the degree or the accessibility index. To provide a comparison to the new hierarchies outlined in this application, the accessibility index will be calculated and plotted to provide a baseline. This allows a demonstration if the new hierarchies are doing better or worse than current methods when the hierarchies are tested in the following section.

Figure 11:
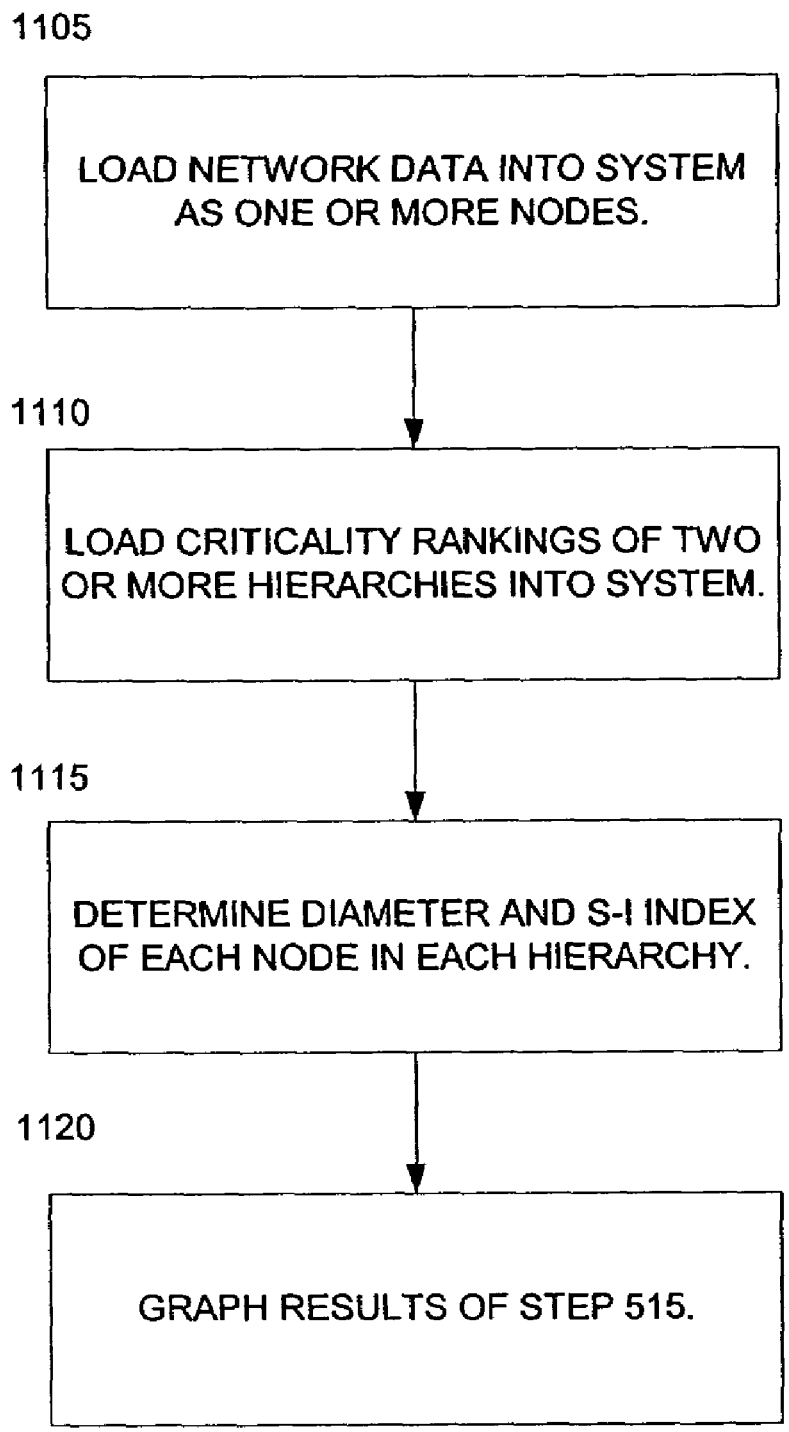
FIG. 11 illustrates the method of testing the effectiveness of the node criticality ranking hierarchies, according to one embodiment of the invention.

FIG. 11 illustrates the method of testing the effectiveness of the node criticality ranking hierarchies, according to one embodiment of the invention. In step 1105, the network data is loaded into the system as one or more nodes. In step 1110, the criticality rankings produced by each hierarchy are loaded into the system.

In step 1115, the diameter and S-I index of each node in each hierarchy is measured. Each node is successively removed according to its rank and the diameter of the network and the S-I is measured for each removed node.

The diameter of the network is the minimum number of hops it takes to get from the two furthest nodes on the network. Mathematically this is expressed as:

$$\text{Diameter} = \text{maximum } D_{ij}$$

where $D_{ij}$=shortest path (in links) between the ith and jth node.

Thus, for example, the longest shortest path in the city-to-city network is Eugene, Oreg. to Ft. Myers Fla., which uses the following route: Eugene, Oreg. to Portland, Oreg. to Seattle, Wash. to Denver, Colo. to St. Louis, Mo. to Atlanta, Ga. to Orlando, Fla. to Tampa, Fla. to Ft. Myer, Fla. The longest shortest path has seven hops, and thus the diameter of the network is seven.

The S-I index of a graph is based on the frequency distribution of the shortest path lengths $s_{ij}$ in the graph. Mathematically, it is defined as the pair (S,I), where:

$$S = \frac{\mu_3}{\mu_2} \text{ and } I = \frac{\mu_2}{\mu_1^2} \quad (7)$$

In the above equation, $\mu_1$ is the first moment (i.e., mean) of the frequency of all shortest paths in the network, $\mu_2$ is the second moment (i.e., variance) of the frequency of all shortest paths in the network, and $\mu_3$ is the third moment (i.e., kurtosis) of the frequency of all shortest paths in the network. Once each moment for the network has been calculated the S index is calculated by dividing the third moment by the second moment, and the I index is calculated by dividing the second moment by the first moment. For example in the city-to-city data network $\mu_1$=2.8274, $\mu_2$=0.8324, and $\mu_3$=0.0444. Thus S=0.0534 and I=0.2944 both providing a measure of connectivity for the network. As nodes are removed from the network the connectivity decreases and the S and I index captures the loss quantitatively.

By examining the S-I index of the US IP network infrastructure as nodes are removed, one can obtain a quantitative indication of how disconnected the network becomes.

The results of both the diameter and S-I index analysis can be found in the example below.

Output of Diameter and S-I Index Analysis on Hierarchies

| Binary Hierarchy | | | |
|---|---|---|---|
| Diameter | CMSA | I = u2/u1 | S = u3/u2 |
| 7 | | 0.2937 | 0.0499 |
| 8 | Atlanta | 0.3416 | 0.0927 |
| 8 | Chicago | 0.3445 | 0.0449 |
| 8 | San Francisco | 0.3466 | 0.0424 |
| 10 | Dallas | 0.4415 | 0.4056 |
| 10 | Washington | 0.4441 | 0.3019 |
| 10 | New York | 0.4463 | 0.3133 |
| 10 | Denver | 0.4602 | 0.3656 |
| 10 | Houston | 0.5313 | 0.4742 |
| 10 | Kansas City | 0.5410 | 0.3871 |
| 10 | Los Angeles | 0.5085 | 0.2671 |
| 10 | Cleveland | 0.5037 | 0.2268 |
| 10 | St. Louis | 0.5096 | 0.1999 |
| 10 | Salt Lake City | 0.5069 | 0.1805 |
| 10 | Boston 2 | 0.5145 | 0.1185 |
| 10 | Phoenix | 0.5374 | 0.1309 |

| Regional Hierarchy | | | |
|---|---|---|---|
| Diameter | CMSA | I = u2/u1 | S = u3/u2 |
| 7 | | 0.2937 | 0.0499 |
| 8 | New York | 0.3029 | 0.0454 |
| 8 | Chicago | 0.3063 | −0.0125 |
| 8 | San Francisco | 0.3155 | −0.0468 |
| 8 | Washington | 0.3318 | −0.0793 |
| 9 | Boston | 0.3938 | 0.2081 |
| 10 | Dallas | 0.4804 | 0.4802 |
| 10 | Denver | 0.4962 | 0.5025 |
| 10 | St. Louis | 0.4982 | 0.4890 |
| 11 | Cleveland | 0.5915 | 0.6812 |
| 11 | Louisville | 0.5933 | 0.6759 |
| 11 | Kansas City | 0.6600 | 0.5959 |
| 12 | Seattle | 0.7778 | 0.9118 |
| 12 | Phoenix | 0.7752 | 0.8822 |
| 12 | Los Angeles | 0.7622 | 0.8810 |
| 12 | Atlanta | 0.7656 | 0.4362 |

| Distance Hierarchy | | | |
|---|---|---|---|
| Diameter | CMSA | I = u2/u1 | S = u3/u2 |
| 7 | | 0.2937 | 0.0499 |
| 8 | Salt Lake City | 0.2935 | 0.0399 |
| 8 | Denver | 0.3003 | 0.0573 |
| 8 | San Francisco | 0.3061 | 0.0246 |
| 9 | Dallas | 0.4081 | 0.5258 |
| 9 | Seattle | 0.4072 | 0.5149 |
| 9 | Chicago | 0.4194 | 0.4465 |
| 9 | Los Angeles | 0.3841 | 0.2800 |
| 10 | Atlanta | 0.4205 | 0.1839 |
| 10 | Washington | 0.4420 | 0.0249 |
| 10 | New York | 0.4394 | −0.1134 |
| 10 | Phoenix | 0.4583 | −0.0784 |
| 11 | Houston | 0.5412 | 0.1520 |
| 13 | Miami | 0.7341 | 0.6719 |
| 14 | Boston | 0.9572 | 0.8135 |
| 16 | Kansas City | 1.3219 | 1.1954 |

| Global Hierarchy | | | |
|---|---|---|---|
| Diameter | CMSA | I = u2/u1 | S = u3/u2 |
| 7 | | 0.2937 | 0.0499 |
| 8 | San Francisco | 0.2981 | 0.0258 |
| 8 | Atlanta | 0.3489 | 0.0779 |
| 8 | Chicago | 0.3518 | 0.0169 |
| 10 | Dallas | 0.4384 | 0.3208 |
| 10 | Denver | 0.4503 | 0.3691 |
| 10 | Washington | 0.4717 | 0.1825 |
| 10 | New York | 0.4672 | 0.0570 |
| 10 | Salt Lake City | 0.4649 | 0.0189 |
| 10 | Los Angeles | 0.4427 | −0.0806 |
| 10 | Houston | 0.4932 | −0.0264 |
| 11 | Kansas City 0.5306 | −0.0190 | |
| 11 | Seattle | 0.5317 | −0.0705 |
| 12 | Phoenix | 0.6464 | 0.2665 |
| 13 | Boston | 0.8097 | 0.3425 |
| 16 | Miami | 1.3219 | 1.1954 |

| Relay Node Hierarchy | | | |
|---|---|---|---|
| Diameter | MSA | I = u2/u1 | S =0 u3/u2 |
| 7 | | 0.2937 | 0.0499 |
| 8 | Kansas City | 0.2958 | 0.0405 |
| 8 | Salt Lake City | 0.2956 | 0.0302 |
| 8 | Indianapolis 0.2949 | 0.0227 | |
| 8 | Seattle | 0.2942 | 0.0137 |
| 10 | Portland | 0.3654 | 0.6527 |
| 10 | Sacramento | 0.3834 | 0.7821 |
| | St. Louis | 0.3866 | 0.7927 |
| 10 | Denver | 0.4063 | 0.7470 |
| 10 | Atlanta | 0.4248 | 0.5493 |
| 10 | Washington-Baltimore | 0.4254 | 0.4537 |
| 10 | Chicago | 0.4285 | 0.3020 |
| 10 | Philadelphia 0.4291 | 0.2970 | |
| 10 | Orlando | 0.4412 | 0.2912 |
| 12 | Jacksonville 0.5249 | 0.6122 | |
| 12 | Phoenix | 0.5237 | 0.6021 |

The diameter results are the easiest to interpret and reveal some interesting findings. The hierarchies with the largest effect on the diameter of the network were the distance hierarchy and the global hierarchy, both of which ended in a diameter of 16 when the top 15 nodes (roughly 10%) were removed. The superior performance of the distance hierarchy confirmed that the best performing hierarchy would be one based on Euclidean distance. The global hierarchy was based on the presence of a large number of long distance links between two different regions. While it did not directly use Euclidean distance there is an obvious correlation between global links between different regions and a longer physical length.

The starting diameter of the network in the case of both the distance and global hierarchy was 7, and the end result of 16 was more than a doubling of the diameter. Thus, it took more than twice the number of hops to reach the two furthest places on the network. This results in a ripple effect across the network where it will take a minimum of twice the time to get from any point to another. This does not take into account the capacity of the links removed and how traffic will be redistributed across the network. While both hierarchies end up at 16 the global hierarchy accelerates more rapidly in the beginning while the distance hierarchy accelerates the diameter more quickly at the end of the nodal hierarchy. The next group of nodal hierarchies was the relay node and regional hierarchy which both end with a diameter of 12. Finally, the binary and bandwidth capacity hierarchy had the least impact each ending in a diameter of 10.

Figure 12:
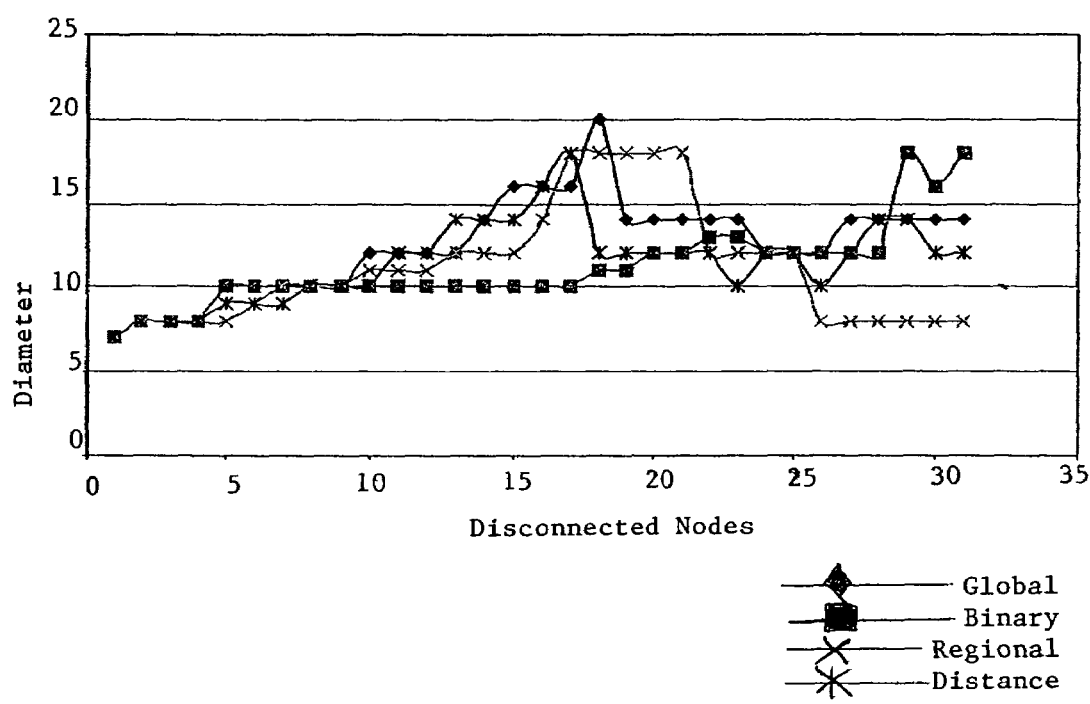
FIGS. 12-13 illustrate an example of the method of testing the effectiveness of the node criticality ranking hierarchies, according to one embodiment of the invention.

In step 1120, the results of step 1115 are plotted in a graph form. The graph format allows a visual indication of which node ranking hierarchy does a better job of identifying critical nodes in a network. The graph format also gives an indication of when the network experiences a catastrophic failure, breaking apart into disconnected components. The diameter relationship of the hierarchies is seen more clearly when all the nodal hierarchies are plotted with their diameters at each successive node removal, as illustrated in FIG. 12.

The graph illustrates two aspects of network resiliency, the diameter of the network, and the point at which the network Balkanizes, indicative of a catastrophic failure. The diameter of the network after each successive node removal is indicated by the number on the x axis. As the diameter increases, it is taking more hops to connect nodes in the network indicating a decrease in efficiency and an increase in latency. Balkanization is indicated at the point that the diameter of network stops increasing and drops of rapidly. At this point, the network has broken into two or more segments and the hierarchy takes the diameter of the largest remaining subgraph. Since the network has segmented into smaller parts, the diameter decreases to match the network's now smaller size. Since the network has now fractured into segments that can no longer communicate with each other, a catastrophic failure has occurred. When the hierarchies were compared using the above indicators, all the hierarchies outperformed the existing standard, the accessibility index. The global hierarchy reached the highest diameter, followed by the distance hierarchy, and regional hierarchy. While the global hierarchy reached the highest diameter the distance hierarchy's case is catastrophic Balkanization in the network first, closely followed by the global hierarchy and then the regional hierarchy. An examination of the S-I index confirms the findings of the diameter analysis.

Figure 13:
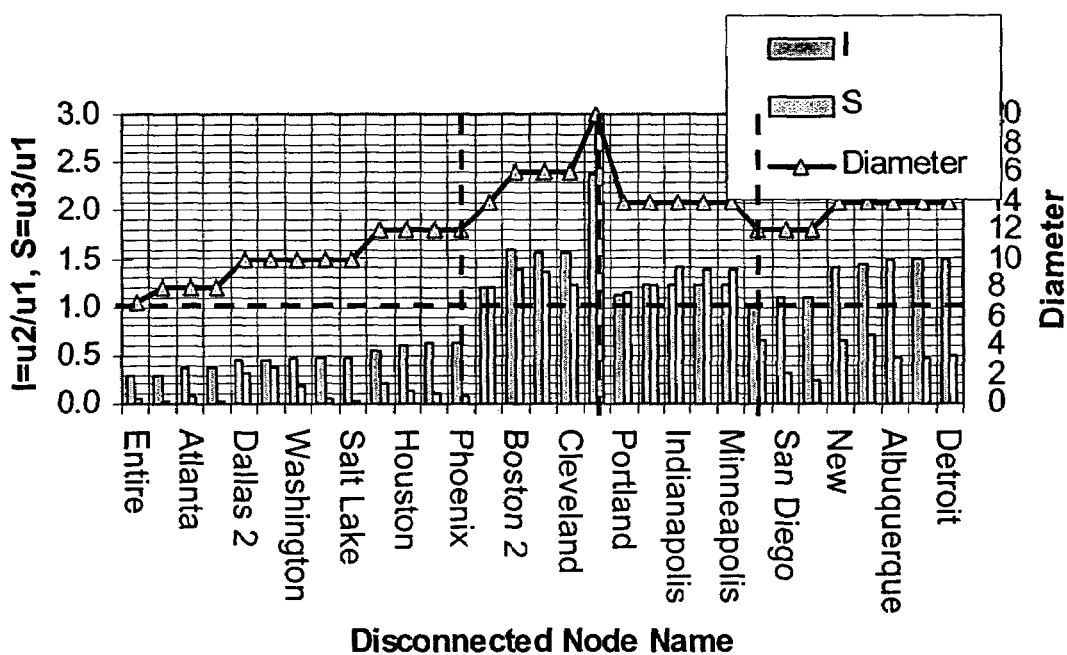

FIG. 13 illustrates the S and I measure of the network as nodes are removed from the network, using the global hierarchy approach. The graph format clearly shows the similar effect S and I have with diameter as nodes are removed and the extreme sensitivity of S to network changes. The graphical approach is different from the typical plotting of the S and I onto the S-I plane as (X,Y) coordinates, but works well in this case to one demonstrate the connection between diameter and the S-I measures, and two show how increases in the S-I index are indicators of a disconnecting network.

Using Nodes to Define Regions

In the examples outlined above, a variety of hierarchies are used to determine what nodes in a network are most critical. Many times, the most critical nodes in a network are already known and may not involve connectivity or the measure outlined above. In this case it is useful to know what regions are impacted by these critical nodes. As before, the regions defined by the hierarchy can be geographic (e.g., a critical hub located in Atlanta) or non-geographic (e.g., a market or industrial sector).

Figure 14:
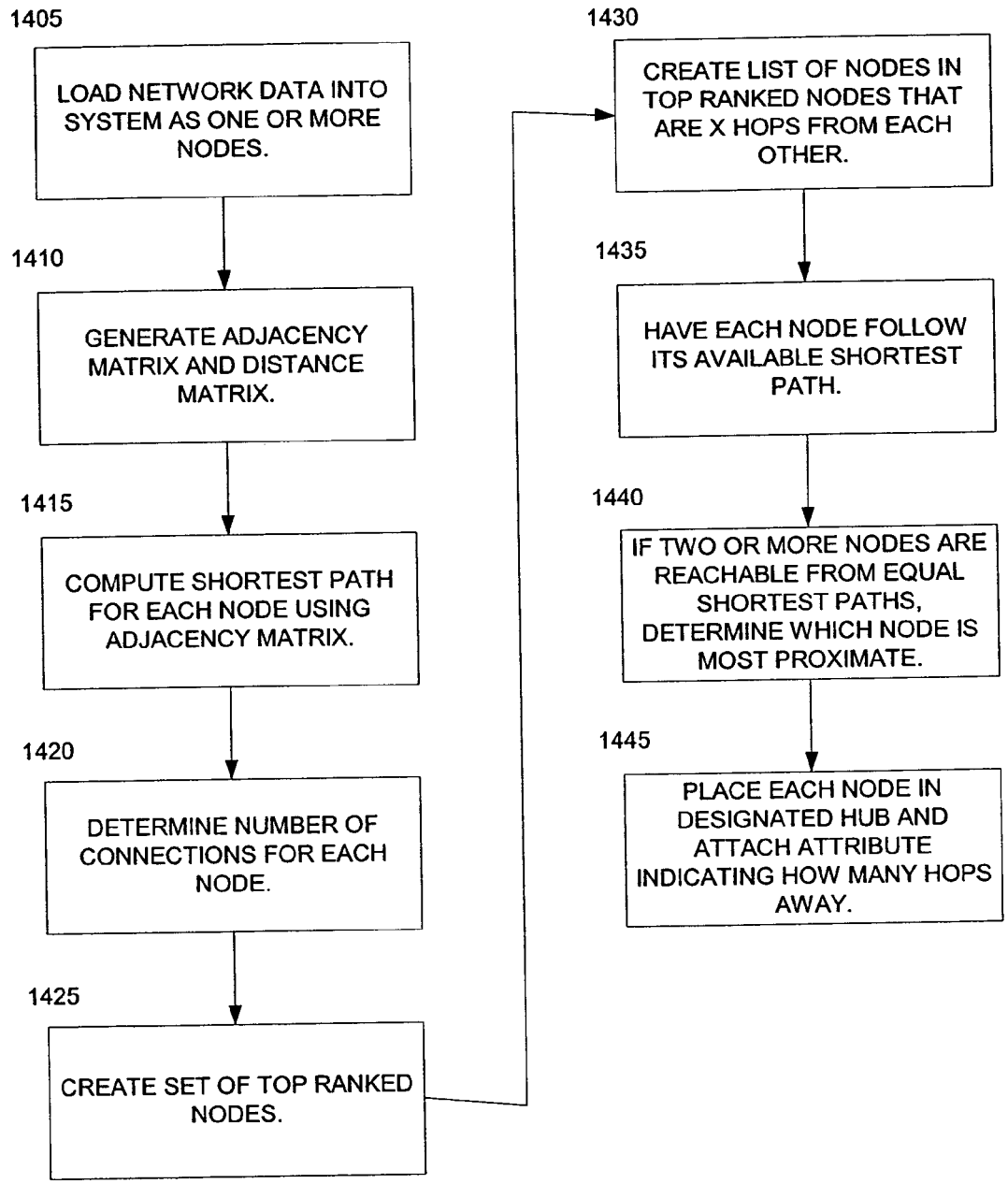
FIG. 14 illustrates the method of defining regions by node connectivity, according to one embodiment of the invention.

FIG. 14 illustrates the method of defining regions by node connectivity, according to one embodiment of the invention. In step 1405, the network data is loaded into the system as one or more nodes. In step 1410, for a network N of nodes n, an adjacency matrix A and a distance matrix W are generated, based on the connectivity of the loaded data Adjacency matrix A is the connectivity matrix of the network being analyzed. In the city-to-city data network, this would be cities and the connections between them. If there were a connection between Jacksonville and Atlanta, one would be entered in matrix A. If there were no connection, then a zero would be entered.

The distance matrix W indicates the distance between any two directly connected nodes in matrix A. In the case of the city-to-city data network, it is the number of miles between any two directly connected cities. For example, a connection between Jacksonville and Atlanta, the distance matrix, would have a value of 281 miles in the cell of the matrix representing the connection between Jacksonville and Atlanta. The members of matrix W represent the distance (e.g., physical distance, latency, or any other appropriate variable) between any two nodes of N.

In step 1415, the shortest path for each node in N is computed using adjacency matrix A. This is done by calculating the shortest number of hops to connect a single node individually with every other node in the network. This process is repeated for every node in the network, thus providing the shortest paths for each node in the network N.

In step 1420, the number of connections for each node in N is determined, and the nodes are ranked in descending order. Thus, assuming that the adjacency matrix A is symmetric, either egress or ingress connections c(i) are computed for each node i of N. These nodes are then ranked in descending order by ingress (egress) connections c.

In step 1425, a set m<n of an arbitrary number of top ranked nodes (e.g., such as, but not limited to, the nodes ranked in step 1420) is created. Thus, for example, the set of nodes could be n={New York, Washington, San Francisco, Seattle, Atlanta}, and the set m of top ranked nodes could be m={New York, Washington, San Francisco}. Selecting the number of hubs in the network is left to the user's discretion. The user can use one of the ranking hierarchies outlined above, or their own qualitative measures based on insider knowledge of a network. Thus, the number is arbitrary to the demands of the user, and which nodes in the network they determine to be critical.

In step 1430, for each member in the m set of nodes (e.g., hubs), a list of nodes that are one hop, two hops, three hops, etc. away from each other, is generated. Thus, for node j in the set m, lists $L_r(j)$ (e.g., of nodes that are 1, 2, . . . s hop distant from node j) and r∈[1, 2, . . . s] are created.

In step 1435, each node in the network follows its available shortest path until a node j in the m set of nodes is reached. This can be calculated by setting $R_j = \Sigma_r L_r(j)$, where $R_j$ represents a region around node j, which is included in the set m (i.e., j∈m). In the city-to-city example, Atlanta, Ga., Washington, D.C., St. Louis, Mo., and San Francisco, Calif. all contain critical data warehouses designated as critical hubs by a firm. The region impacted by the loss of a data warehouse could then be ascertained using this hierarchy, by determining which nodes fall under a particular data warehouses region of connectivity. When Jacksonville's shortest path is calculated to all the hubs in the list, it is two hops from Atlanta, three hops from Washington, four hops from St. Louis and six hops from San Francisco. Thus the hierarchy would place Jacksonville as belonging to Atlanta's region.

Starting with the highest ranked node of set m, the list of nodes that are s hops away from node j (i.e., $L_r(j)$) is compared to the list of nodes that are s hops away from node k (i.e., $L_r(k)$), where k is not one of the highest ranking nodes included in the set m (i.e., k≠j). One-hop connections (if there are any) between the top nodes in the set of m nodes are not included.

In step 1440, if there are two or more nodes in the set reachable from equal shortest paths, this tie is broken by determining which node is more proximate. Proximity can be defined by distance, capacity, latency, or any other appropriate metric. Thus, if there is a common node q that is r hops away from both j and k, then the physical distances $d_{jq}$ and $d_{kq}$ between nodes j to q and k to q from the distance matrix W are compared. If $d_{jq} \leq d_{kq}$ then node q belongs to the list $L_r(j)$ or region $R_j$, whose members are exactly r hops away from node j∈m. If $d_{jq} > d_{kq}$, then q belongs to the list $L_r(k)$ region $R_k$, whose members are exactly r hops away from node k∈m.

Building on the data warehouse example, let Charlotte be assigned to a region and be two hops from Washington, two hops from Atlanta, three hops from St. Louis, and five hops from San Francisco. Because there is a tie between Washington and Atlanta, the tiebreaker would be done based on which city is closer to Charlotte. In the case of Euclidean distance, matrix W would be referenced, and the lower value would be selected (i.e., Washington is 350 miles from Charlotte, but Atlanta is only 200 miles from Charlotte.) Thus Charlotte would be placed in Atlanta's region. As with the distance hierarchy, different values can be used to indicate distance between two nodes (e.g., capacity, flow, etc.).

Figure 15:
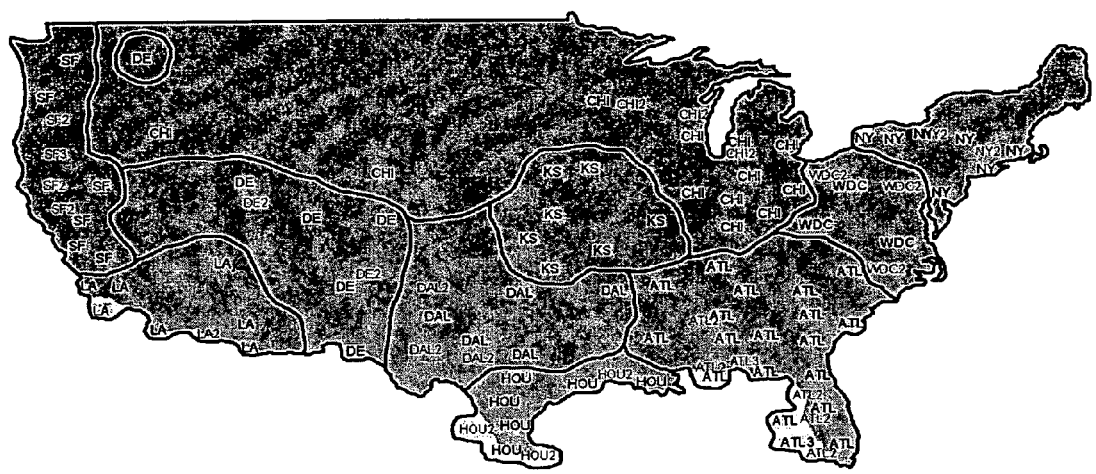
FIG. 15 illustrates an example of the method of defining regions by node connectivity, according to one embodiment of the invention.

In step 1445, each node is placed in a set under its designated hub and attached to an attribute indicating how many hops the node is from its designated hub. In the data-warehousing example, both Charlotte and Jacksonville would have a two attributed to them, because they were both two hops away from Atlanta. Each of these lists comprises a region that can be mapped, as illustrated in FIG. 15.

In this example, nodes that are one hop from the regional hub are given the hubs abbreviated name (i.e., ATL=Atlanta) and cities that are more than one hop away are designated by the abbreviated name followed by the number of hops (i.e., ATL2=two hops away from Atlanta). It should be noted that the distance variable could be substituted with a bandwidth capacity variable, or other variable of the user's choice, as best fits the hierarchy's application. In this case, distance was used because network design most often incorporates a distance cost variable when selecting link build outs.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the Figures described above, which highlight the functionality and advantages of the present invention, are presented for example purposes only. The architecture of the present invention is sufficiently flexible and configurable, such that it may be utilized in ways other than that shown in the Figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of using critical nodes in at least one network to define critical regions in the at least one network, comprising:
    loading network data into at least one system as at least one series of nodes;
    generating at least one distance matrix;
    generating at least one adjacency matrix based on the at least one distance matrix;
    computing at least one shortest path for each node using the at least one adjacency matrix;
    determining at least one number of connections for each node;
    ranking the nodes based on the at least one number of connections for each node;
    creating at least one set of top ranked nodes;
    for each member of the at least one set of top ranked nodes, generating at least one list of nodes that are x hops away from the member;
    for each node in the at least one network, determining at least one shortest path until a node in the set of top ranked nodes is reached; and
    placing each node in the set of top ranked nodes under at least one designated hub and attaching an attribute for each node representing how many hops each node is from its designated hub;
    wherein the ranking comprises regional ranking, distance ranking, global ranking, or relay ranking, or any combination thereof;
    wherein the regional ranking global defines connections as links that connect at least two different regions and local connections as links within at least one region;
    wherein the distance ranking defines global connections as links over a certain distance threshold and local connections as links under a certain distance threshold;
    wherein the global ranking is based on at least one number of global connections utilizing either the regional ranking or distance ranking;
    wherein the relay ranking accounts for at least one ratio of total capacity connected to a node and demand for that capacity to identify nodes that are acting as relays between large demand areas.

2. The method of claim 1, further comprising:
    if there are two or more nodes in the set of top ranked nodes reachable from equal shortest paths, determining which node is more proximate and putting that node first on the ranking.

3. The method of claim 1, wherein the network data comprises:

satellite imagery data;
digitized map data;
topological map data;
photo data;
satellite geo-spatial data;
telecommunication data;
marketing data;
demographic data;
business data;
NAIC code location data;
right-of-way routing layers data;
metropolitan area fiber geo-spatial data;
long haul fiber geo-spatial data;
co-location facilities geo-spatial data;
internet exchanges geo-spatial data;
wireless towers geo-spatial data;
wire centers geo-spatial data;
undersea cables geo-spatial data;
undersea cable landings geo-spatial data;
data centers geo-spatial data;
static network data; or
dynamic network data; or
any combination of the above.

4. The method of claim 3, wherein the right-of-way routing layers data comprises:
gas pipeline data;
oil pipeline data;
highway data;
rail data; or;
electric power transmission lies data; or
any combination of the above.

5. The method of claim 3, wherein the logical network data comprises:
static network data; or
dynamic network data; or
any combination of the above.

6. The method of claim 5, wherein the static network data comprises:
IP network data; or
network topology data; or
any combination of the above.

7. The method of claim 5, wherein the dynamic network data comprises network traffic data.

8. The method of claim 1, wherein the regional ranking comprises utilizing:
continent information;
nation information;
state information;
county information;
zip code information;
census block information;
census track information;
time information;
metropolitan information; or
functional information; or
any combination of the above.

9. The method of claim 8, wherein the function information comprises:
at least one formula;
at least one federal reserve bank region;
at least one trade zone;
at least one census region; or
at least monetary region; or
any combination of the above.

10. A system of using critical nodes in at least one network to define critical regions in the at least one network, comprising:
at least one computer; and
at least one computer program stored on a memory, and configured to operate on the at least one computer, the computer program configured for:
loading network data into at least one system as at least one series of nodes;
generating at least one distance matrix;
generating at least one adjacency matrix based on the at least one distance matrix;
computing at least one shortest path for each node using the at least one adjacency matrix;
determining at least one number of connections for each node;
ranking the nodes based on the at least one number of connections for each node;
creating at least one set of top ranked nodes;
for each member of the at least one set of top ranked nodes, generating at least one list of nodes that are x hops away from the member;
for each node in the at least one network, determining at least one shortest path until a node in the set of top ranked nodes is reached; and
placing each node in the set of top ranked nodes under at least one designated hub and attaching an attribute for each node representing how many hops each node is from its designated hub;
wherein the ranking comprises regional ranking, distance ranking, global ranking, or relay ranking, or any combination thereof;
wherein the regional ranking global defines connections as links that connect at least two different regions and local connections as links within at least one region;
wherein the distance ranking defines global connections as links over a certain distance threshold and local connections as links under a certain distance threshold;
wherein the global ranking is based on at least one number of global connections utilizing either the regional ranking or distance ranking;
wherein the relay ranking accounts for at least one ratio of total capacity connected to a node and demand for that capacity to identify nodes that are acting as relays between large demand areas.

11. The system of claim 10, further comprising:
if there are two or more nodes in the set of top ranked nodes reachable from equal shortest paths, determining which node is more proximate and putting that node first on the ranking.

12. The system of claim 10, wherein the network data comprises:
satellite imagery data;
digitized map data;
topological map data;
photo data;
satellite geo-spatial data;
telecommunication data;
marketing data;
demographic data;
business data;
NAIC code location data;
right-of-way routing layers data;
metropolitan area fiber geo-spatial data;
long haul fiber geo-spatial data;
co-location facilities geo-spatial data;
internet exchanges geo-spatial data;
wireless towers geo-spatial data;
wire centers geo-spatial data;
undersea cables geo-spatial data;

undersea cable landings geo-spatial data;
data centers geo-spatial data;
static network data; or
dynamic network data; or
any combination of the above.

13. The system of claim 12, wherein the right-of-way routing layers data comprises:
gas pipeline data;
oil pipeline data;
highway data;
rail data; or;
electric power transmission lies data; or
any combination of the above.

14. The system of claim 12, wherein the logical network data comprises:
static network data; or
dynamic network data; or
any combination of the above.

15. The system of claim 14, wherein the static network data comprises:
IP network data; or
network topology data; or
any combination of the above.

16. The system of claim 14, wherein the dynamic network data comprises network traffic data.

17. The system of claim 10, wherein the regional ranking comprises utilizing: continent information; nation information; state information; county information; zip code information; census block information; census track information; time information; metropolitan information; or functional information; or any combination of the above.

18. The system of claim 17, wherein the function information comprises:
at least one formula;
at least one federal reserve bank region;
at least one trade zone;
at least one census region; or
at least monetary region; or
any combination of the above.

* * * * *